US012580851B2

(12) United States Patent
Yu et al.

(10) Patent No.: US 12,580,851 B2
(45) Date of Patent: Mar. 17, 2026

(54) PACKET PROCESSING METHOD AND SYSTEM, AND NETWORK DEVICE

(71) Applicant: HUAWEI TECHNOLOGIES CO., LTD., Shenzhen (CN)

(72) Inventors: Boyuan Yu, Nanjing (CN); Qi Yu, Hangzhou (CN); Penghe Tang, Nanjing (CN); Yi Kai, Shenzhen (CN); Huanhuan Zhang, Nanjing (CN); Nu Xia, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 138 days.

(21) Appl. No.: 18/512,350

(22) Filed: Nov. 17, 2023

(65) Prior Publication Data

US 2024/0089198 A1      Mar. 14, 2024

Related U.S. Application Data

(63) Continuation of application No. PCT/CN2022/094363, filed on May 23, 2022.

(30) Foreign Application Priority Data

May 21, 2021    (CN) ......................... 202110559629.X
Jul. 8, 2021    (CN) ......................... 202110770871.1

(51) Int. Cl.
*H04L 45/00*        (2022.01)
(52) U.S. Cl.
CPC ............ *H04L 45/38* (2013.01); *H04L 45/566* (2013.01)

(58) Field of Classification Search
CPC .............................. H04L 45/38; H04L 45/566
USPC .......................................................... 709/238
See application file for complete search history.

(56) References Cited

U.S. PATENT DOCUMENTS

| | | | | |
|---|---|---|---|---|
| 2015/0181459 | A1* | 6/2015 | Zhu ..................... | H04L 43/0829 370/236 |
| 2016/0043969 | A1 | 2/2016 | Sung et al. | |
| 2016/0261428 | A1* | 9/2016 | Song ................... | H04L 12/4641 |
| 2016/0316361 | A1* | 10/2016 | Bhargava .............. | H04W 12/04 |
| 2020/0322274 | A1 | 10/2020 | Copley | |

(Continued)

FOREIGN PATENT DOCUMENTS

| | | |
|---|---|---|
| CA | 2356567 A1 | 2/2003 |
| CN | 111865704 A | 10/2020 |
| EP | 3691185 A1 | 8/2020 |

*Primary Examiner* — Wing F Chan
*Assistant Examiner* — Leon Y Tseng
(74) *Attorney, Agent, or Firm* — WOMBLE BOND DICKINSON (US) LLP

(57) ABSTRACT

A packet processing method and system, and a network device are disclosed, and belong to the field of network technologies. A first network device sends a first packet to a second network device through a first tunnel, and sends a second packet to a third network device through a second tunnel. The second network device forwards the first packet to the third network device through a third tunnel. The third network device processes the first packet and the second packet. The first network device is located at a first site. The second network device and the third network device are located at a second site. The first site and the second site are connected through a wide area network. Wide area network multipath transmission may be implemented in a multi-gateway scenario.

20 Claims, 14 Drawing Sheets

<u>100</u>

(56)      References Cited

U.S. PATENT DOCUMENTS

2020/0396150 A1* 12/2020 Dillon ................. H04L 47/2441
2021/0112034 A1    4/2021 Sundararajan et al.
2022/0294665 A1* 9/2022 Jameson ................. H04L 45/74
2023/0179521 A1* 6/2023 Markuze ................. H04L 45/20
                                                      709/238

* cited by examiner

PACKET PROCESSING METHOD AND SYSTEM, AND NETWORK DEVICE

CROSS-REFERENCE TO RELATED APPLICATIONS

This application is a continuation of International Application No. PCT/CN2022/094363, filed on May 23, 2022, which claims priorities to Chinese Patent Application No. 202110559629.X, filed on May 21, 2021 and Chinese Patent Application No. 202110770871.1, filed on Jul. 8, 2021. All of the aforementioned patent applications are hereby incorporated by reference in their entireties.

TECHNICAL FIELD

This application relates to the field of network technologies, and in particular, to a packet processing method and system, and a network device.

BACKGROUND

A dual-gateway solution may be applied during campus network interconnection. The dual-gateway solution can improve network connection reliability. For example, a headquarters campus network of an enterprise has two gateways, for example, a primary gateway and a secondary gateway, which connect to another branch campus network of the enterprise. The primary gateway forwards data flows between the headquarters campus network and branch campus network. When the primary gateway is faulty, the secondary gateway forwards data flows between the headquarters campus network and the branch campus network.

If the campus network is connected to a wide area network through the primary or secondary gateway, data is transmitted between the campus networks through the wide area network using a single path.

SUMMARY

This application provides a packet processing method and system, and a network device, to implement wide area network multipath transmission in a multi-gateway scenario.

According to a first aspect, a packet processing system is provided. The system includes a first network device, a second network device, and a third network device.

The first network device is located at a first site. The second network device and the third network device are located at a second site. The first site and the second site are connected through a wide area network. For example, the first network device is located in one branch of an enterprise, and the second network device and the third network device are located in a headquarters of the enterprise. Both the branch and headquarters of the enterprise are connected through a wide area network.

The first network device is configured to: send a first packet to the second network device through a first tunnel, and send a second packet to the third network device through a second tunnel.

The second network device is configured to forward the first packet to the third network device through a third tunnel.

The third network device is configured to process the first packet and the second packet.

The third network device may receive packets of a same data flow that are sent by the first network device through multiple paths. Therefore, the third network device may process the packets sent by the first network device through the multiple paths. In other words, the packet processing system implements wide area network multipath transmission in a multi-gateway scenario.

In an embodiment, the first network device is configured to: add a first sequence number to a tunnel packet that belongs to the first tunnel and carries the first packet and add a second sequence number to a tunnel packet that belongs to the second tunnel and carries the second packet. The second network device is configured to add, based on the first sequence number, the first sequence number to a tunnel packet that belongs to the third tunnel and carries the first packet. The third network device is configured to process the first packet and the second packet based on the first sequence number and the second sequence number.

For example, the first network device adds a tunnel header to the first packet to obtain a first tunnel packet, and sets a sequence number in the tunnel header. The first network device adds a tunnel header to the second packet to obtain a second tunnel packet, and sets a sequence number in the tunnel header. When receiving the first tunnel packet, the second network device replaces the tunnel header of the first tunnel packet with a new tunnel header, to obtain a third tunnel packet, and copies the sequence number in the tunnel header of the first tunnel packet to a tunnel header of the third tunnel packet. When receiving the first tunnel packet and the third tunnel packet, the third network device may process, based on the sequence number included in the tunnel header of the first tunnel packet and the sequence number included in the tunnel header of the third tunnel packet, the first packet included in the first tunnel packet and a third packet included in the third tunnel packet. For example, the third network device sends the first packet and the second packet to the second site in an ascending order of sequence numbers.

The first network device adds the sequence number to the tunnel packet, and the second network device copies the sequence number when forwarding the received packet, so that the third network device may process the received packet based on the sequence number. The packet processing system can implement wide area network multipath transmission in a multi-gateway scenario and ensure that a packet is sent to a destination site as required. This avoids an out-of-order problem that may be caused by wide area network multipath transmission.

In an embodiment, the tunnel packet that belongs to the first tunnel and carries the first packet includes a flow identifier, and the tunnel packet that belongs to the second tunnel and carries the second packet includes a flow identifier. The second network device is configured to add, based on the flow identifier, the flow identifier to the tunnel packet that belongs to the third tunnel and carries the first packet. The flow identifier is used to identify a data flow to which each of the first packet and the second packet belongs.

For example, the first network device may distinguish between different data flows based on flow identifiers. The first network device adds a first flow identifier to a tunnel packet of a first data flow, and adds a second flow identifier to a tunnel packet of a second data flow. After receiving the tunnel packet sent by the first network device, the second network device replaces the tunnel header of the tunnel packet to obtain a new tunnel packet, and copies the flow identifier in the tunnel packet to the new tunnel packet. After receiving the tunnel packet sent by the first network device and the tunnel packet sent by the second network device, the third network may distinguish between the first data flow and the second data flow based on the first flow identifier and the second flow identifier. The first network device may set a same sequence number for tunnel packets of different data flows, and the third network device may assign the packets with a same sequence number to different data flows based on the flow identifier.

The first network device adds the flow identifier to the tunnel packet, and the second network device copies the flow identifier when forwarding the received packet, so that the third network device may process the received packet based on the flow identifier. The packet processing system may distinguish the data flows based on flow identifiers.

In an embodiment, the tunnel packet that belongs to the second tunnel and carries the second packet includes a primary identifier. The primary identifier indicates the third network device to process the second packet.

In an embodiment, the tunnel packet that belongs to the first tunnel and carries the first packet includes a forwarding identifier. The forwarding identifier indicates the second network device to forward the first packet.

The primary identifier indicates a network device that receives the tunnel packet including the primary identifier to process the tunnel packet including the primary identifier. For example, the primary identifier indicates the network device to send a packet included in the tunnel packet to a destination site, or indicates the network device to implement a multipath optimization technology based on the tunnel packet, and then send the packet to the destination site.

The forwarding identifier indicates a network device that receives the tunnel packet including the forwarding identifier to forward the tunnel packet including the forwarding identifier. To be specific, the network device neither directly sends a packet included in the tunnel packet to the destination site, nor implements the multipath optimization technology based on the tunnel packet.

The first network device may set different primary identifiers and forwarding identifiers for packets of different data flows. For example, the first network device sets a primary identifier for some packets that belong to the first tunnel and carry the first data flow, and sets a forwarding identifier for other packets that belong to the second tunnel and carry the first data flow. The first network device sets a forwarding identifier for some packets that belong to the first tunnel and carry the second data flow, and sets a primary identifier for other packets that belong to the second tunnel and carry the second data flow. Therefore, the second network device forwards the packet of the first data flow to the third network device, and the third network device forwards the packet of the second data flow to the second network device. The second network device processes the packet of the second data flow. The third network device processes the packet of the first data flow.

The first network device may further set different primary identifiers and forwarding identifiers for data flow packets in different time periods. For example, the first network device sets a primary identifier for some packets that belong to the first tunnel and carry a first time period, and sets a forwarding identifier for other packets that belong to the second tunnel and carry the first time period. The first network device sets a forwarding identifier for some packets that belong to the first tunnel and carry a second time period, and sets a primary identifier for other packets that belong to the second tunnel and carry the second time period. Therefore, in the first time period, the second network device forwards the packet to the third network device, and the third network device is responsible for processing the packet. In the second time period, the third network device forwards the packet to the second network device, and the third network device is responsible for processing the packet.

The first network device sets the primary identifier or the forwarding identifier in the tunnel packet, so that the second network device and the third network device may select, based on the identifier included in the tunnel packet, to forward the packet or process the packet. The packet forwarding system can balance processing loads of the second network device and the third network device, and distribute traffic on a transmission path between the second network device and the second site and a transmission path between the third network device and the second site. This prevents occurrence of a bandwidth bottleneck from the second network device or the third network device to an egress of the second site.

In an embodiment, the tunnel packet that belongs to the second tunnel and carries the second packet includes an optimization technology identifier. The third network device processes the first packet and the second packet based on an optimization technology indicated by the optimization technology identifier. The optimization technology includes one or more of the following: load balancing, multi-fed and selective receiving, or multipath forward error correction (FEC).

For example, the first network device sets an optimization technology identifier in the tunnel packet of the first data flow that is sent to the third network device to load balancing, and sets an optimization technology identifier in the tunnel packet that of the second data flow that is sent to the third network device to multi-fed and selective receiving. In this case, the third network device sends the packet of the first data flow to the second site, and the third network device removes a duplicate packet when sending the packet of the second data flow to the second site.

The first network device sets the optimization technology identifier in the tunnel packet, so that the third network device can implement a corresponding multipath optimization technology based on the optimization technology identifier. The packet forwarding system improves flexibility of implementing different wide area network multipath optimization technologies.

In an embodiment, the third network device is configured to: send a third packet to the second network device through a fourth tunnel, and send a fourth packet to the first network device through a fifth tunnel. The second network device is configured to forward the third packet to the first network device through a sixth tunnel. The first network device is configured to process the third packet and the fourth packet.

In other words, when the second site sends a packet to the first site, the multipath optimization technology may also be implemented. The packet processing system can implement a bidirectional wide area network multipath optimization technology in the multi-gateway scenario.

According to a second aspect, a packet processing method is provided. The method includes: A first network device sends a first packet to a second network device through a first tunnel, and sends a second packet to a third network device through a second tunnel.

The first network device is located at a first site. The second network device and the third network device are located at a second site. The first site and the second site are connected through a wide area network.

In an embodiment, the first network device adds a first sequence number to a tunnel packet that belongs to the first tunnel and carries the first packet and adds a second sequence number to a tunnel packet that belongs to the second tunnel and carries the second packet.

In an embodiment, the tunnel packet that belongs to the first tunnel and carries the first packet includes a flow identifier. The tunnel packet that belongs to the second tunnel and carries the second packet includes a flow identifier. The flow identifier is used to identify a data flow to which each of the first packet and the second packet belongs.

In an embodiment, the tunnel packet that belongs to the second tunnel and carries the second packet includes a primary identifier. The primary identifier indicates the third network device to process the second packet.

In an embodiment, the tunnel packet that belongs to the first tunnel and carries the first packet includes a forwarding identifier. The forwarding identifier indicates the second network device to forward the first packet.

In an embodiment, the tunnel packet that belongs to the second tunnel and carries the second packet includes an optimization technology identifier. The optimization technology identifier indicates the third network device to process the first packet and the second packet based on an optimization technology indicated by the optimization technology identifier. The optimization technology includes one or more of the following: load balancing, multi-fed and selective receiving, or multipath FEC.

According to a third aspect, a packet processing method is provided. The method includes: A first network device receives a first packet sent by a second network device through a first tunnel, and forwards the first packet to a third network device through a second tunnel.

The first network device and the third network device are located at a first site. The second network device is located at a second site. The first site and the second site are connected through a wide area network.

In an embodiment, a tunnel packet that belongs to the first tunnel and carries the first packet includes a sequence number. The first network device adds, based on the sequence number, the sequence number to a tunnel packet that belongs to the second tunnel and carries the first packet.

In an embodiment, the tunnel packet that belongs to the first tunnel and carries the first packet includes a flow identifier. The first network device adds, based on the flow identifier, the flow identifier to the tunnel packet that belongs to the second tunnel and carries the first packet.

In an embodiment, the tunnel packet that belongs to the first tunnel and carries the first packet includes a forwarding identifier. The first network device forwards the first packet based on the forwarding identifier.

In an embodiment, the first network device receives a second packet sent by the second network device through the first tunnel.

In an embodiment, the tunnel packet that belongs to the first tunnel and carries the second packet includes a primary identifier. The first network device processes the second packet based on the primary identifier.

In an embodiment, the tunnel packet that belongs to the first tunnel and carries the second packet includes an optimization technology identifier. The first network device processes the second packet based on an optimization technology indicated by the optimization technology identifier. The optimization technology includes one or more of the following: load balancing, multi-fed and selective receiving, or multipath FEC.

In an embodiment, the first network device receives a third packet sent by the third network device through a third tunnel, and forwards the third packet to the second network device through a fourth tunnel.

According to a fourth aspect, a first network device is provided. The first network device includes an obtaining module and a sending module.

The obtaining module is configured to obtain a plurality of packets. The plurality of packets include a first packet and a second packet.

The sending module is configured to: send the first packet to a second network device through a first tunnel, and send the second packet to a third network device through a second tunnel.

The first network device is located at a first site. The second network device and the third network device are located at a second site. The first site and the second site are connected through a wide area network.

In an embodiment, the sending module is further configured to: add a first sequence number to a tunnel packet that belongs to the first tunnel and carries the first packet, and add a second sequence number to a tunnel packet that belongs to the second tunnel and carries the second packet.

In an embodiment, the tunnel packet that belongs to the first tunnel and carries the first packet includes a flow identifier, and the tunnel packet that belongs to the second tunnel and carries the second packet includes a flow identifier. The flow identifier is used to identify a data flow to which each of the first packet and the second packet belongs.

In an embodiment, the tunnel packet that belongs to the second tunnel and carries the second packet includes a primary identifier. The primary identifier indicates the third network device to process the second packet.

In an embodiment, the tunnel packet that belongs to the first tunnel and carries the first packet includes a forwarding identifier. The forwarding identifier indicates the second network device to forward the first packet.

In an embodiment, the tunnel packet that belongs to the second tunnel and carries the second packet includes an optimization technology identifier. The optimization technology identifier indicates the third network device to process the first packet and the second packet based on an optimization technology indicated by the optimization technology identifier. The optimization technology includes one or more of the following: load balancing, multi-fed and selective receiving, or multipath FEC.

According to a fifth aspect, a second network device is provided. The second network device includes a receiving module and a sending module.

The receiving module is configured to receive a first packet sent by a first network device through a first tunnel.

The sending module is configured to forward the first packet to a third network device through a second tunnel.

The first network device is located at a first site. The second network device and the third network device are located at a second site. The first site and the second site are connected through a wide area network.

In an embodiment, the tunnel packet that belongs to the first tunnel and carries the first packet includes a sequence number. The sending module is further configured to add, based on the sequence number, the sequence number to a tunnel packet that belongs to the second tunnel and carries the first packet.

In an embodiment, the tunnel packet that belongs to the first tunnel and carries the first packet includes a flow identifier. The sending module is further configured to add, based on the flow identifier, the flow identifier to the tunnel packet that belongs to the second tunnel and carries the first packet.

In an embodiment, the tunnel packet that belongs to the first tunnel and carries the first packet includes a forwarding identifier. The sending module is configured to forward the first packet based on the forwarding identifier.

In an embodiment, the second network device further includes a processing module.

The receiving module is configured to receive a second packet sent by the first network device through the first tunnel.

The processing module is configured to process the second packet.

In an embodiment, the tunnel packet that belongs to the first tunnel and carries the second packet includes a primary identifier. The processing module is further configured to process the second message based on the primary identifier.

In an embodiment, the tunnel packet that belongs to the first tunnel and carries the second packet includes an optimization technology identifier. The processing module is configured to process the second packet based on an optimization technology indicated by the optimization technology identifier. The optimization technology includes one or more of the following: load balancing, multi-fed and selective receiving, or multipath FEC.

In an embodiment, the receiving module is further configured to receive a third packet sent by the third network device through a third tunnel. The sending module is further configured to forward the third packet to the first network device through a fourth tunnel.

According to a sixth aspect, a network device is provided. The network device includes a processor and a memory. The memory stores a program. The processor is configured to execute the program stored in the memory to perform the packet processing method according to any one of the second aspect or the possible implementations of the second aspect, or the packet processing method according to any one of the third aspect or the possible implementations of the third aspect.

According to a seventh aspect, a computer-readable storage medium is provided. The computer-readable storage medium stores a computer program. When the computer program is executed by a processor, the packet processing method according to any one of the second aspect or the possible implementations of the second aspect, or the packet processing method according to any one of the third aspect or the possible implementations of the third aspect is performed.

BRIEF DESCRIPTION OF DRAWINGS

FIG. 8 is another schematic diagram of a tunnel header format according to an embodiment of this application;

8

Figure 9:
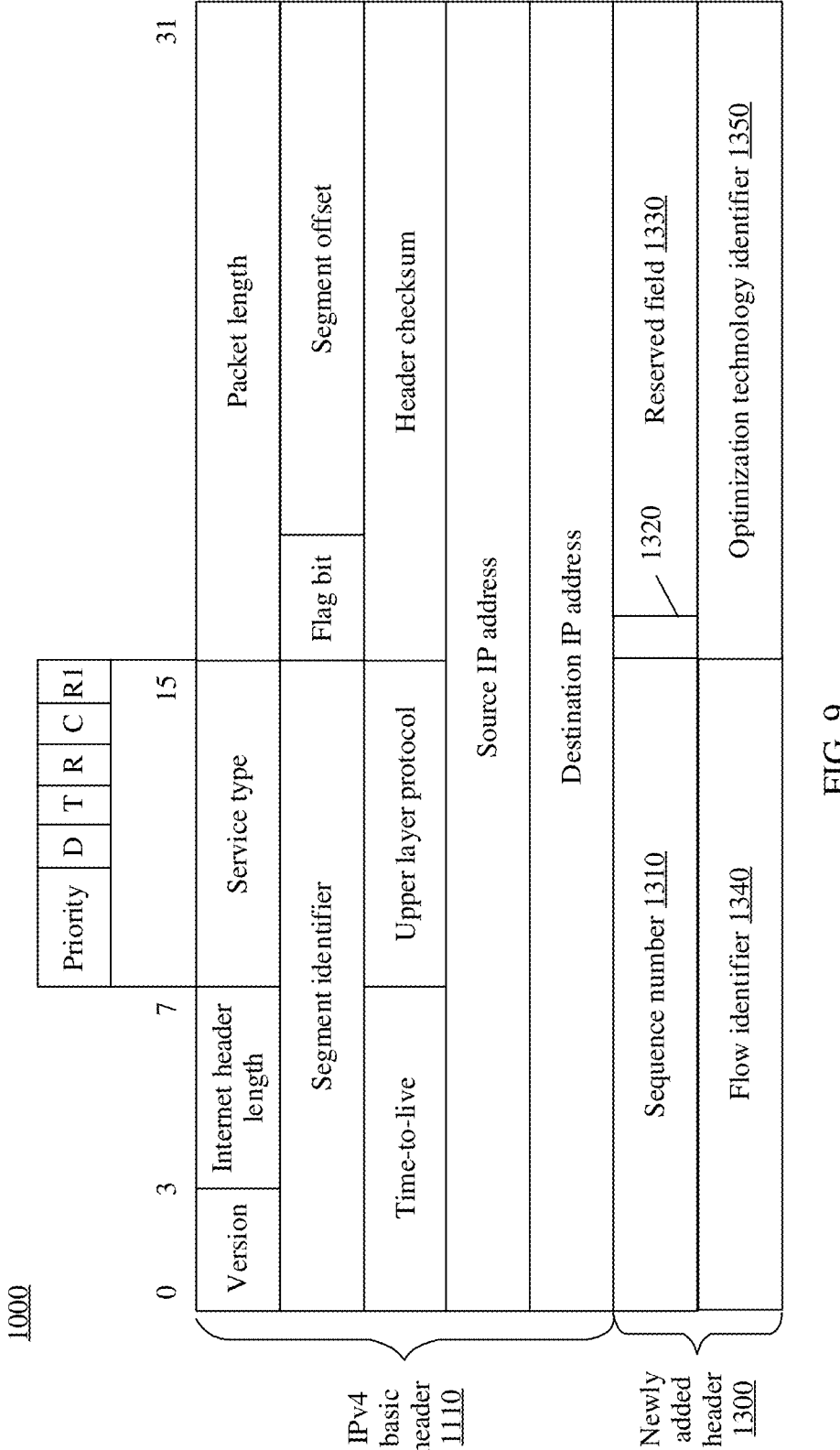
Figure 10:
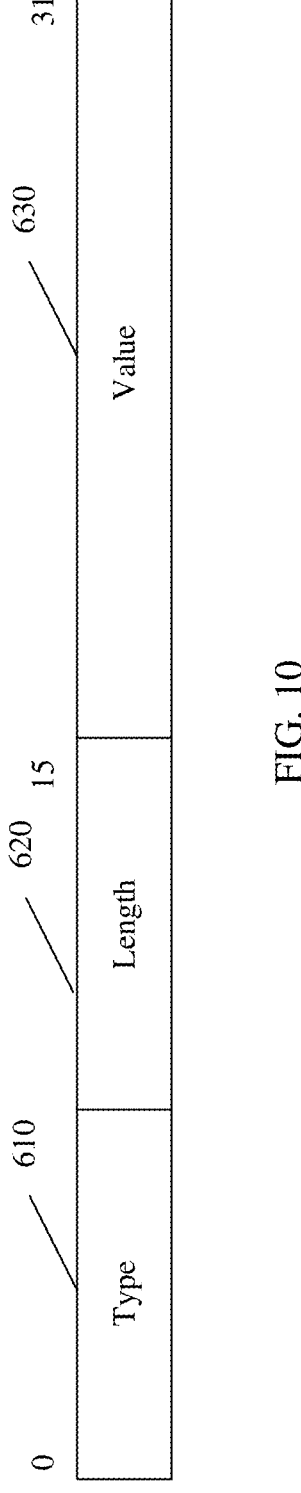
Figure 11:
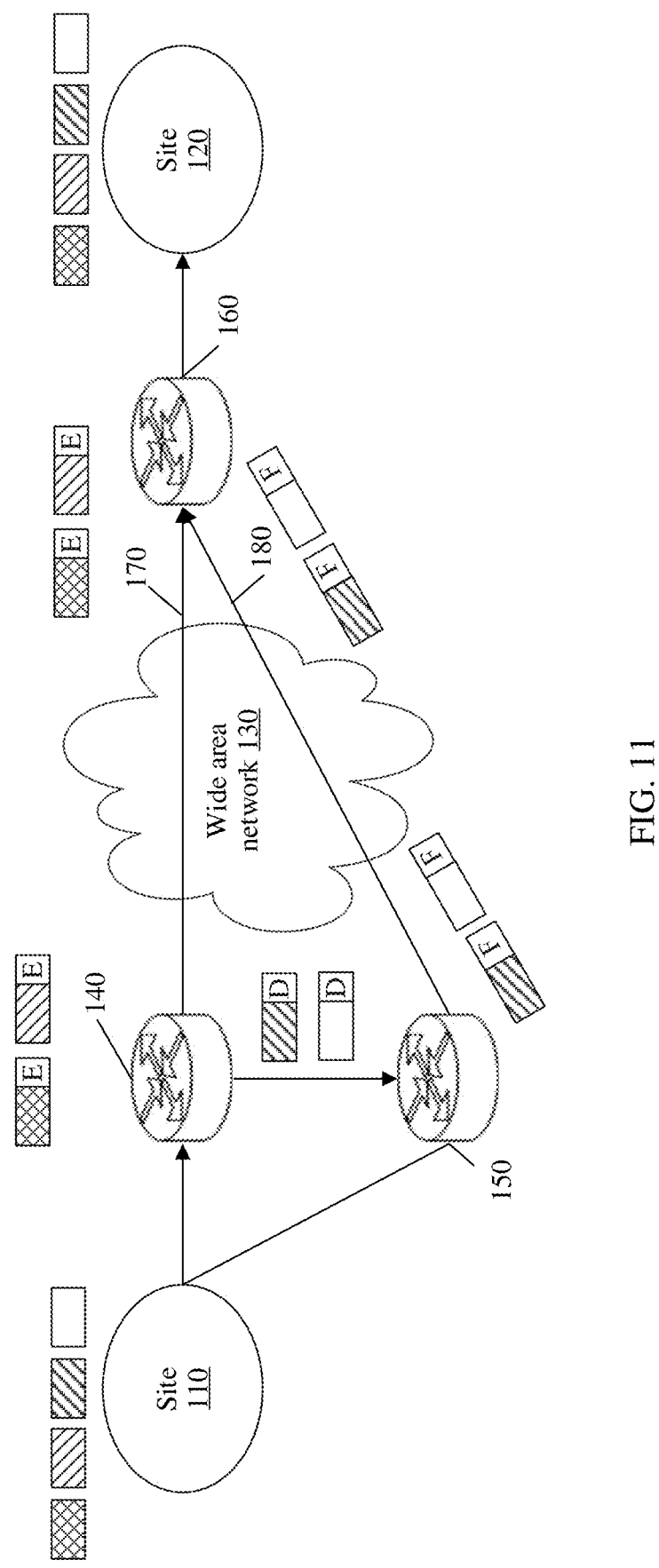
Figure 12:
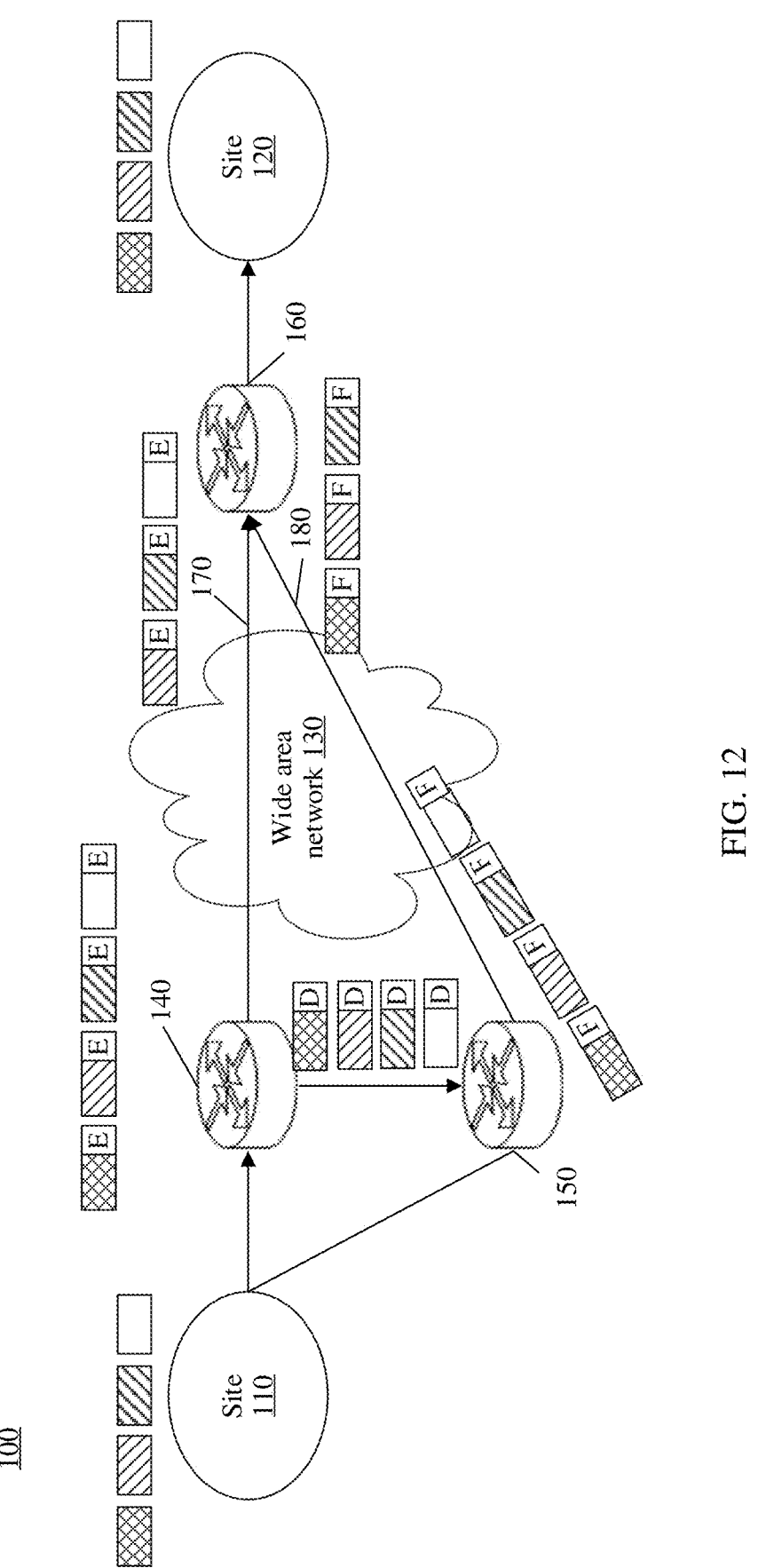
Figure 13:
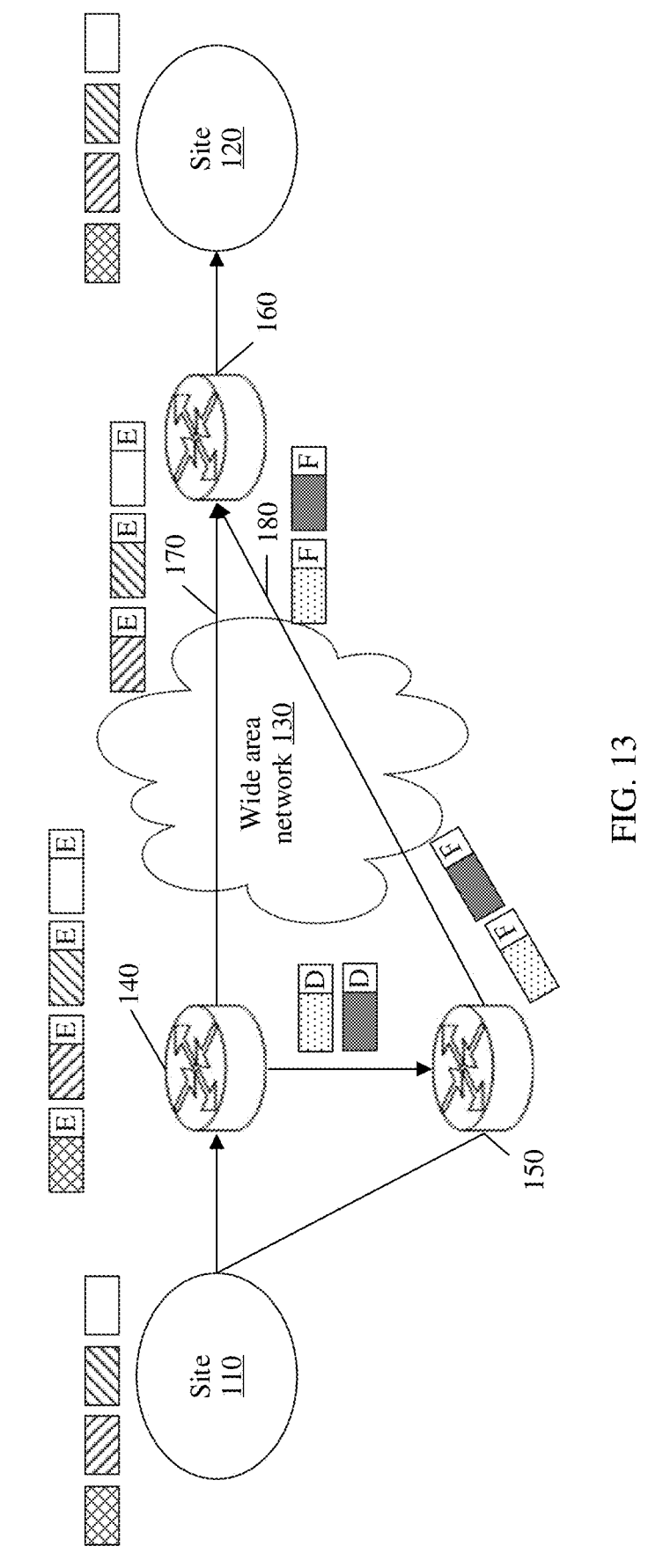
Figure 14:
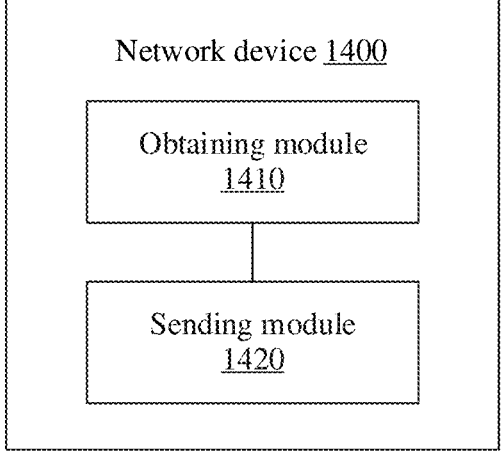
Figure 15:
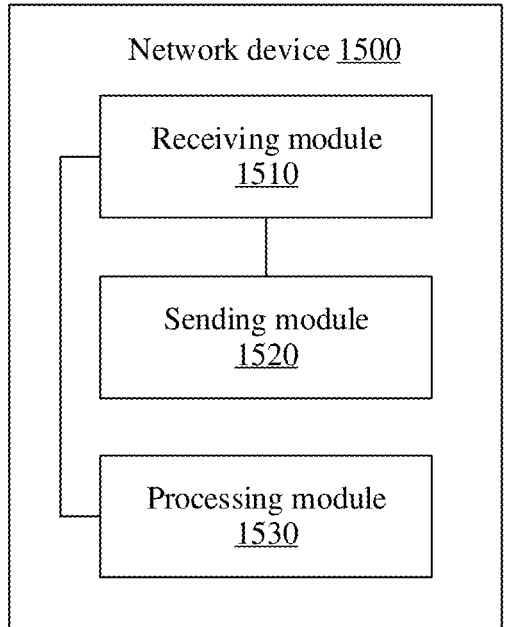
Figure 16:
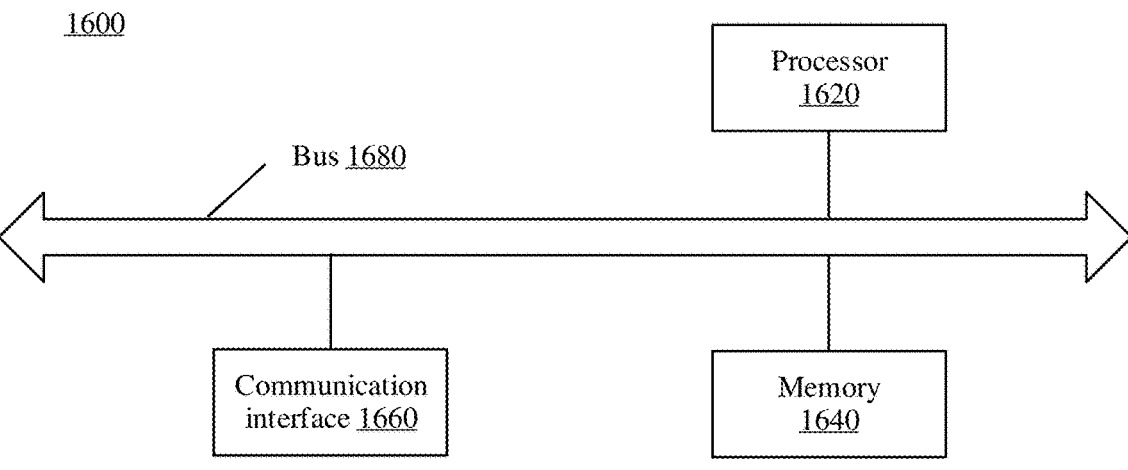
Figure 17:
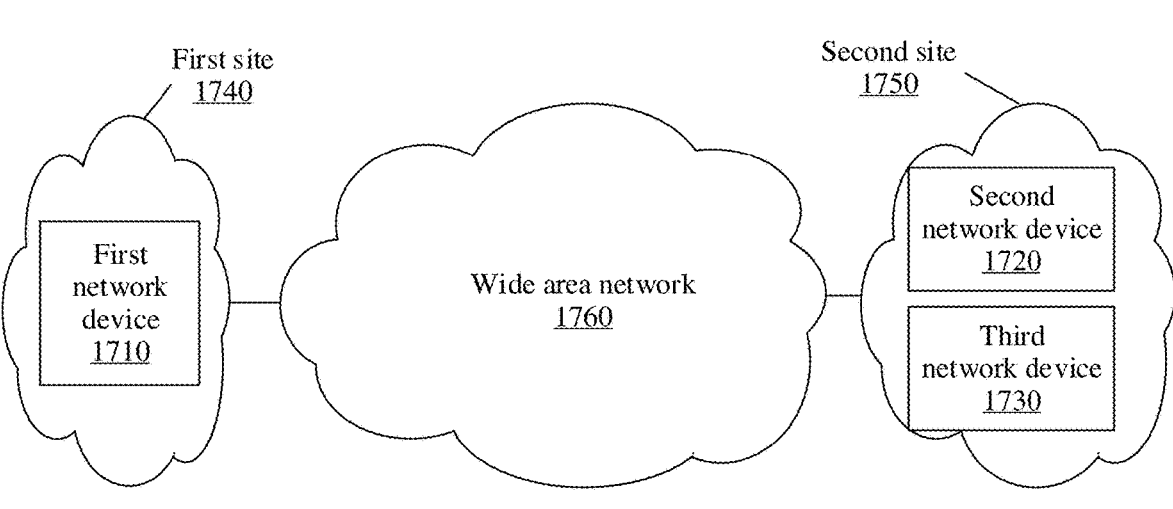

FIG. 9 is another schematic diagram of a tunnel header format according to an embodiment of this application;

FIG. 10 is a schematic diagram of a TLV format according to an embodiment of this application;

FIG. 11 is another schematic diagram of a solution for implementing load balancing in a dual-gateway scenario according to an embodiment of this application;

FIG. 12 is another schematic diagram of a solution for implementing multi-fed and selective receiving in a dual-gateway scenario according to an embodiment of this application;

FIG. 13 is another schematic diagram of a solution for implementing multipath FEC in a dual-gateway scenario according to an embodiment of this application;

FIG. 14 is a schematic diagram of a logical structure of a network device according to an embodiment of this application;

FIG. 15 is another schematic diagram of a logical structure of a network device according to an embodiment of this application;

FIG. 16 is a schematic diagram of a hardware structure of a network device according to an embodiment of this application; and FIG. 17 is a schematic diagram of a packet processing system according to an embodiment of this application.

DESCRIPTION OF EMBODIMENTS

To make the principles, technical solutions, and advantages of this application clearer, the following further describes implementations of this application in detail with reference to the accompanying drawings.

Figure 1:
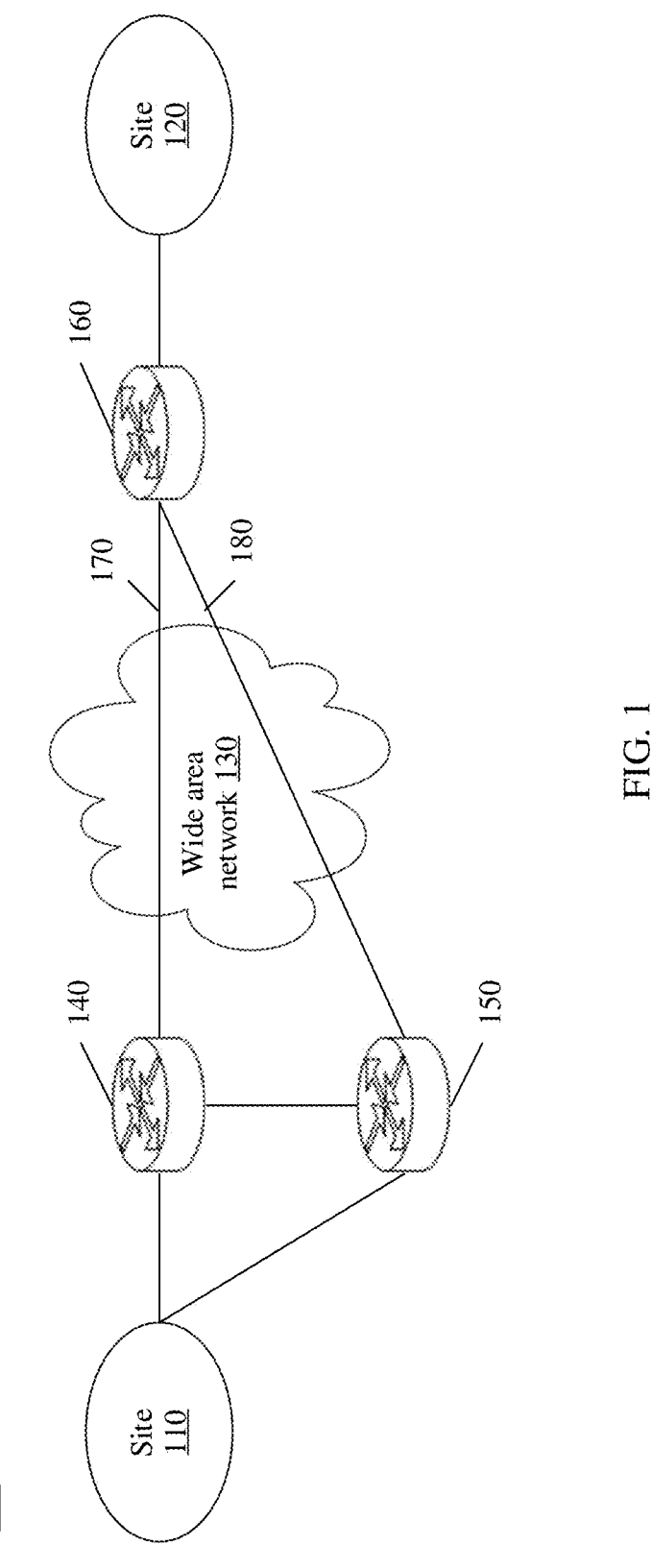
FIG. 1 is a schematic diagram of an implementation environment according to an embodiment of this application.

FIG. 1 is a schematic diagram of an implementation environment according to an embodiment of this application. As shown in FIG. 1, the implementation environment includes a communication network 100. The communication network 100 includes a plurality of sites. For example, the communication network 100 includes a site 110 and a site 120. The site can be used in multiple scenarios. For example, the site may be an office network of an enterprise. Correspondingly, the site 110 may be a headquarters campus network of a specific enterprise, and the site 120 may be a branch campus network of the enterprise. For another example, the site may be a production network in an industrial scenario. For example, the site 110 is a network of a central control room in an industrial scenario, and the site 120 is a network of a terminal in the industrial scenario. For example, the central control room includes a programmable logic controller (PLC) and/or a server. For example, the terminal includes a camera and/or a laser ranging device. For another example, the site may be a campus network. Correspondingly, the site 110 may be a headquarters campus network of a school, and the site 120 may be a branch campus network of the school. The site 110 and the site 120 communicate with each other through a wide area network 130. The wide area network 130 may be a plurality of types of networks. For example, the wide area network 130 is an internet protocol (IP)/multi-protocol label switching (MPLS) network. Alternatively, the wide area network 130 may further include a fifth generation broadband cellular network technology (5G) network. The site can be connected to the wide area network through one or more gateway devices. For example, the site 110 is connected to the wide area network 130 through a gateway device 140 and a gateway device 150. The site 120 is connected to the wide area network 130 through a gateway device 160. The gateway device may be a plurality of types of devices, for example, a router and a switch.

When the site 120 needs to send a packet to the site 110, the gateway device 160 receives the packet, and sends the packet to the gateway device 140 through a tunnel. The tunnel may be of a plurality of types. For example, the tunnel may be a generic routing encapsulation (GRE) tunnel, or the tunnel may be an IP in IP tunnel. After receiving a tunnel packet, the gateway device 140 removes a tunnel header and sends a load to the site 110.

The site is connected to the wide area network through multiple gateway devices, improving connection reliability of the site. For example, if the gateway device 140 is faulty, the site 110 may be further connected to the wide area network through the gateway device 150. In this case, the gateway device 160 sends the packet to the gateway device 150 through a tunnel. After receiving a tunnel packet, the gateway device 150 removes a tunnel header and sends a load to the site 110.

The site is connected to the wide area network through the multiple gateway devices, so that multiple paths exist between sites. For example, a path 170 and a path 180 may exist between the site 120 and the site 110. If the gateway device may apply a multipath optimization technology to a data flow, transmission quality of the data flow may be improved. The multipath optimization technology includes a plurality of optimization technologies, for example, load balancing, multi-fed and selective receiving, and multipath FEC. Load balancing means that a transmitting end sends a packet of a data flow to a receiving end through multiple paths, so that the data flow can use transmission resources of the multiple paths, to improve a throughput of the data flow. Multi-fed and selective receiving means that a transmitting end makes a plurality of copies of each packet of a data flow, and sends a plurality of packets through multiple paths, to improve a probability of receiving each packet by a receiving end as much as possible and reduce impact of a link packet loss on the data flow. Multipath FEC means that a transmitting end generates a redundant packet based on an original packet, and sends the original packet and the redundant packet through multiple paths. When a packet loss or an error occurs on a link, a receiving end may recover an original packet in which a packet loss or an error occurs based on a portion of the original packet and a portion of the redundant packet. An operation performed by the transmitting end is referred to as FEC encoding, and an operation performed by the receiving end is referred to as FEC decoding. If a data sender sends a plurality of data packets to multiple gateways in a distributed manner, the multiple gateways may receive only distributed data, and no gateway can obtain the complete a plurality of data packets and implement the multipath optimization technology.

Figure 2:
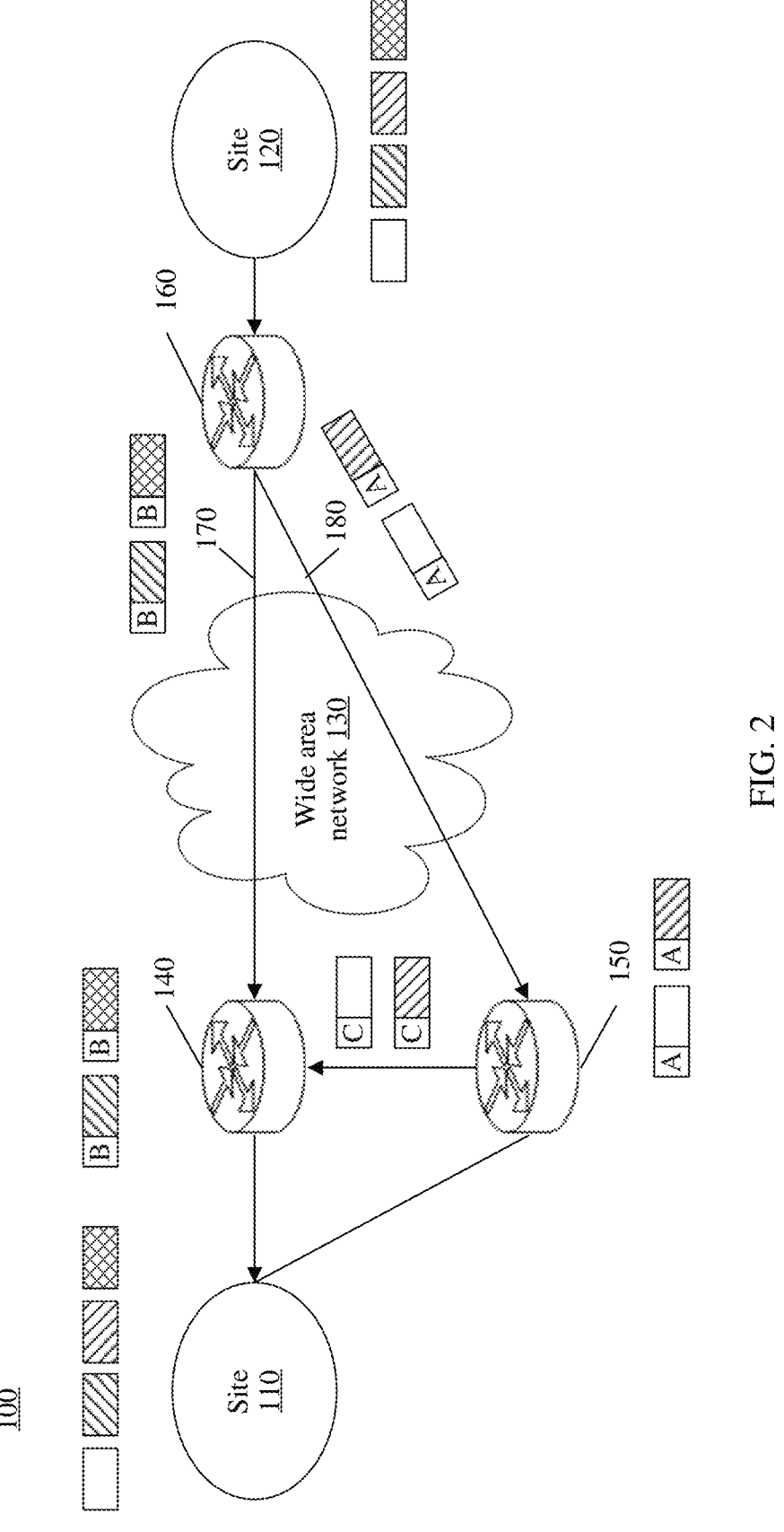
FIG. 2 is a schematic diagram of a solution for implementing load balancing in a dual-gateway scenario according to an embodiment of this application.

According to the technical solution provided in this embodiment of this application, a wide area network multipath optimization technology can be implemented in a multi-gateway scenario, to improve transmission quality of a data flow. Multiple gateways include two or more than two gateways. For ease of description, the following describes the technical solutions provided in embodiments of this application by using an example in which the multiple gateways are two gateways. In the following, a gateway that processes a packet is referred to as a primary gateway, and a gateway that forwards the packet to the primary gateway is referred to as a secondary gateway. For example, as shown in FIG. 2, the primary gateway may be a gateway device 140, and the secondary gateway may be a gateway device

10

150. If there are more than two gateways, one is the primary gateway and the others are secondary gateways.

A source site (for example, a site 120) sends a packet to a destination site (for example, site 110) through a wide area network. The destination site is connected to the wide area network through multiple gateways. For example, the site 110 is connected to the wide area network through the gateway device 140 and the gateway device 150. To implement a multipath optimization technology, a network device that sends a packet sends some packets in a plurality of packets to the primary gateway, and sends other packets in the plurality of packets to the secondary gateway, so that the plurality of packets are transmitted through different paths. To enable the packets to reach different gateways of the destination site, the network device establishes a tunnel A with the secondary gateway, and establishes a tunnel B with the primary gateway. The network device sends some packets to the primary gateway through the tunnel B, and sends other packets to the secondary gateway through the tunnel A. After receiving the packets through the tunnel A, the secondary gateway forwards the packets to the primary gateway through a tunnel C. Therefore, the primary gateway may receive the packets sent by the network device that sends the packets through multiple paths. The primary gateway may process the received packets based on a multipath optimization technology used by the network device that sends the packets. That the primary gateway processes the received packets includes: The primary gateway sends the received packets to the destination site. For example, if the network device that sends the packets implements load balancing, the primary gateway sends the received packets to the destination site. For another example, if the network device that sends the packets implements multi-fed and selective receiving, the primary gateway removes a duplicate packet when sending the packets to the destination site. For another example, if the network device that sends the packets implements FEC encoding, the primary gateway implements, based on the received packets, FEC decoding and sends recovered original packets to the destination site. Therefore, according to the technical solution provided in this embodiment of this application, a wide area network multipath optimization technology can be implemented in a multi-gateway scenario, to improve transmission quality of a data flow.

The network device that sends the packets may be a server, a host, a router, a switch, or the like. For example, a gateway device of the source site is one router. The router receives a packet sent by a server in the source site to the destination site, and selects different gateway devices of the destination site for the packet. For another example, if a specific server in the source site may directly establish a tunnel with different gateway devices in the destination site and send a packet, the network device that sends the packets may be the server. The following describes the technical solution provided in this embodiment of this application by using an example in which the network device is the gateway of the source site.

Figure 3:
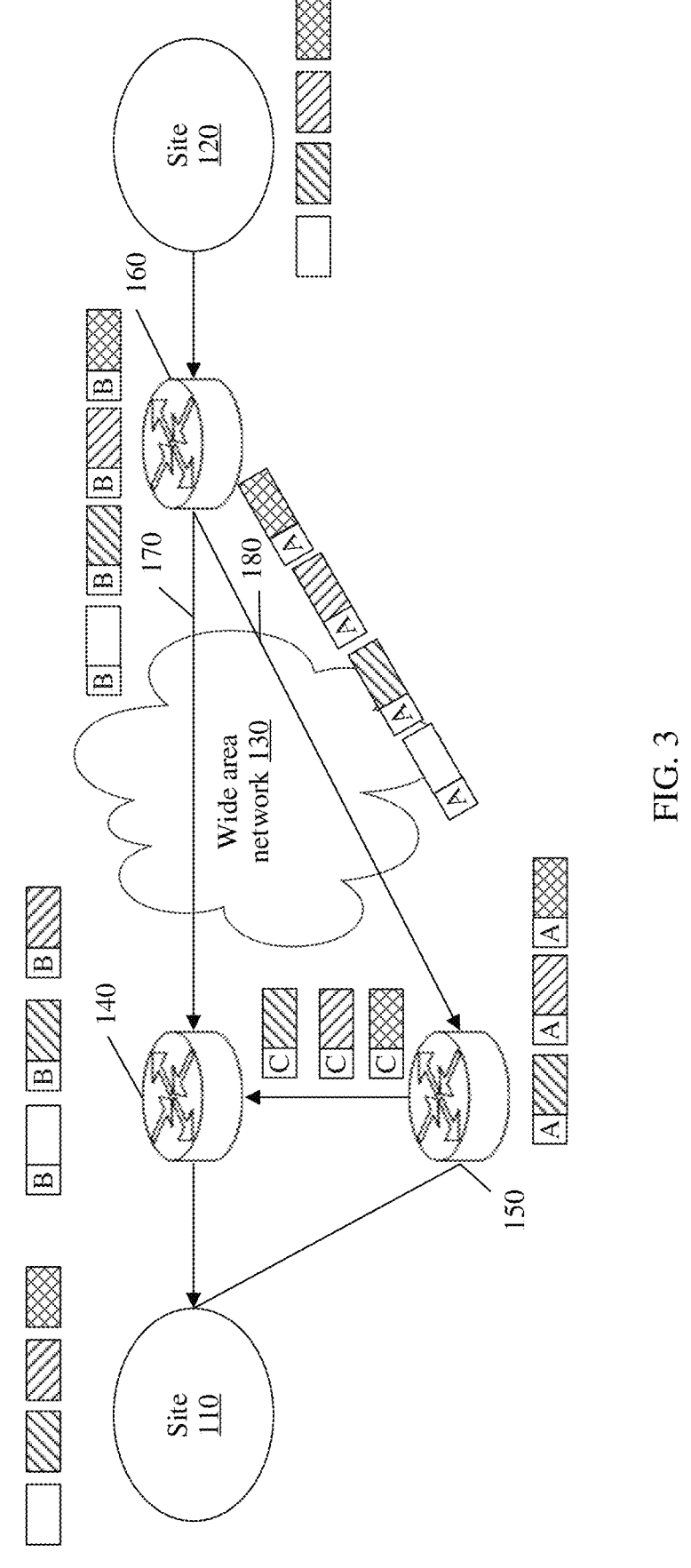
FIG. 3 is a schematic diagram of a solution for implementing multi-fed and selective receiving in a dual-gateway scenario according to an embodiment of this application.
Figure 4:
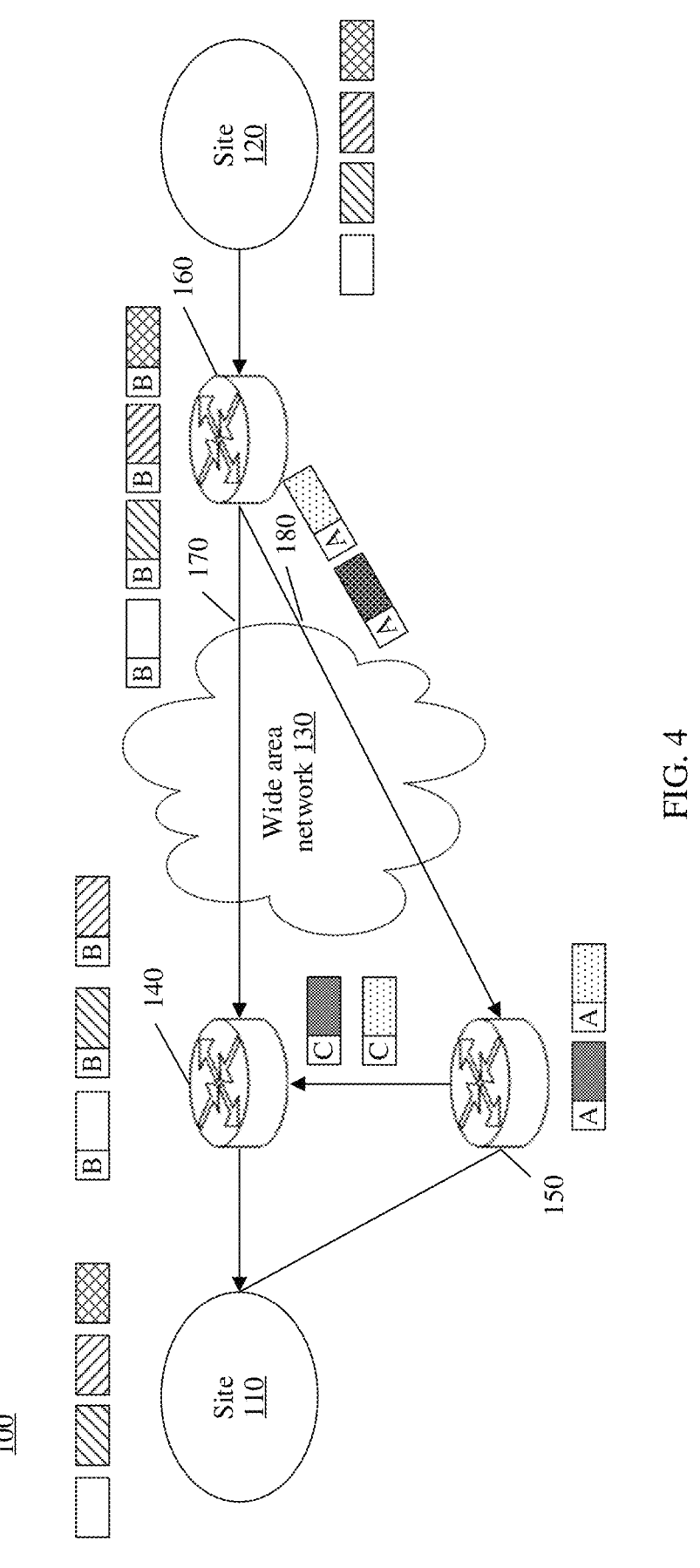
FIG. 4 is a schematic diagram of a solution for implementing multipath FEC in a dual-gateway scenario according to an embodiment of this application.

According to the technical solution provided in this embodiment of this application, a plurality of wide area network optimization technologies may be implemented in a multi-gateway scenario. The following describes the technical solution provided in an embodiment of this application by using load balancing, multi-fed and selective receiving, and multipath FEC as examples. FIG. 2 shows a technical solution for implementing load balancing in a dual-gateway scenario. FIG. 3 shows a technical solution for implementing multi-fed and selective receiving in a dual-gateway scenario. FIG. 4 shows a technical solution for implementing multipath FEC in a dual-gateway scenario.

FIG. 2 shows the technical solution for implementing load balancing in the dual-gateway scenario. A gateway device 160 receives four packets from a site 120. The gateway device 160 sends a first packet and a third packet to a gateway device 150 through a tunnel A. The gateway device 160 sends a second packet and a fourth packet to a gateway device 140 through a tunnel B. The tunnel A and the tunnel B transmit packets based on different transmission paths. For example, the tunnel A transmits a packet through a path 180 shown in FIG. 2, and the tunnel B transmits a packet through a path 170 shown in FIG. 2. When receiving the first packet and the third packet, the gateway device 150 forwards the first packet and the third packet to the gateway device 140 through a tunnel C. After receiving the tunnel packets, the gateway device 140 removes tunnel headers, and sends original packets to a site 110. As shown in FIGS. 2, A, B, and C indicate tunnel headers of the tunnel A, the tunnel B, and the tunnel C respectively. In the following, a tunnel header of the tunnel A is briefly referred to as a tunnel header A, a tunnel header of the tunnel B is briefly referred to as a tunnel header B, and a tunnel header of the tunnel C is briefly referred to as a tunnel header C. The gateway device 160 sends the four packets through the two paths, and the gateway device 150 forwards the received two packets to the gateway device 140. Therefore, the gateway device 140 may receive the packets sent by the gateway device 160 through the two paths, and send the packets to a destination site. Therefore, this solution implements load balancing in the dual-gateway scenario, so that a multipath transmission capability can be fully utilized for a data flow, and transmission quality of the data flow is improved.

FIG. 3 shows a technical solution for implementing multi-fed and selective receiving in a dual-gateway scenario. A gateway device 160 receives four packets from a site 120. The gateway device 160 makes a copy of each packet. The gateway device 160 sends four copied packets to a gateway device 150 through a tunnel A. The gateway device 160 sends the four original packets to a gateway device 140 through a tunnel B. The tunnel A and the tunnel B transmit packets based on different transmission paths. For example, the tunnel A transmits a packet based on a path 180, and the tunnel B transmits a packet based on a path 170. Because a packet loss may occur on a transmission path, the gateway device 140 may receive only a first original packet, a second original packet, and a third original packet, and the gateway device 150 may receive only a second copied packet, a third copied packet, and a fourth copied packet. The gateway device 150 forwards the second copied packet, the third copied packet, and the fourth copied packet to the gateway device 140 through a tunnel C. The gateway device 140 receives the three original packets and the three copied packets. The gateway device receives two copies of the second packet and two copies of the third packet. The gateway device 140 deletes duplicate packets, and sends the first original packet, the second original packet, the third original packet, and the fourth original packet that are not duplicate to a site 110. As shown in FIGS. 3, A, B, and C indicate a tunnel header A, a tunnel header B, and a tunnel header C respectively. This solution implements multi-fed and selective receiving in the dual-gateway scenario. This can prevent a packet loss that may exist in a transmission link, and improve transmission quality of a data flow.

FIG. 4 shows a technical solution for implementing multipath FEC in a dual-gateway scenario. A gateway device 160 receives four packets from a site 120. The gateway device 160 implements FEC encoding based on the four packets to generate two redundant packets. The gateway device 160 sends the two redundant packets to a gateway device 150 through a tunnel A. The gateway device 160 sends the four original packets to a gateway device 140 through a tunnel B. The tunnel A and the tunnel B transmit packets based on different transmission paths. For example, the tunnel A transmits a packet based on a path 180, and the tunnel B transmits a packet based on a path 170. Because a packet loss or a link error may occur on a transmission path, the gateway device 140 may receive only a first original correct packet, a second original correct packet, and a third original correct packet. The gateway device 150 may receive two redundant packets. The gateway device 150 forwards the two redundant packets to the gateway device 140 through a tunnel C. The gateway device 140 receives the three original correct packets and the two redundant packets. The gateway device 140 performs FEC decoding based on the received packets to recover a fourth original packet, and sends the four original packets to a site 110. As shown in FIGS. 4, A, B, and C indicate a tunnel header A, a tunnel header B, and a tunnel header C respectively. This solution implements multipath FEC in the dual-gateway scenario. This can prevent a packet loss and a link error that may exist in a transmission link, and improve transmission quality of a data flow.

Figures 5, 6:
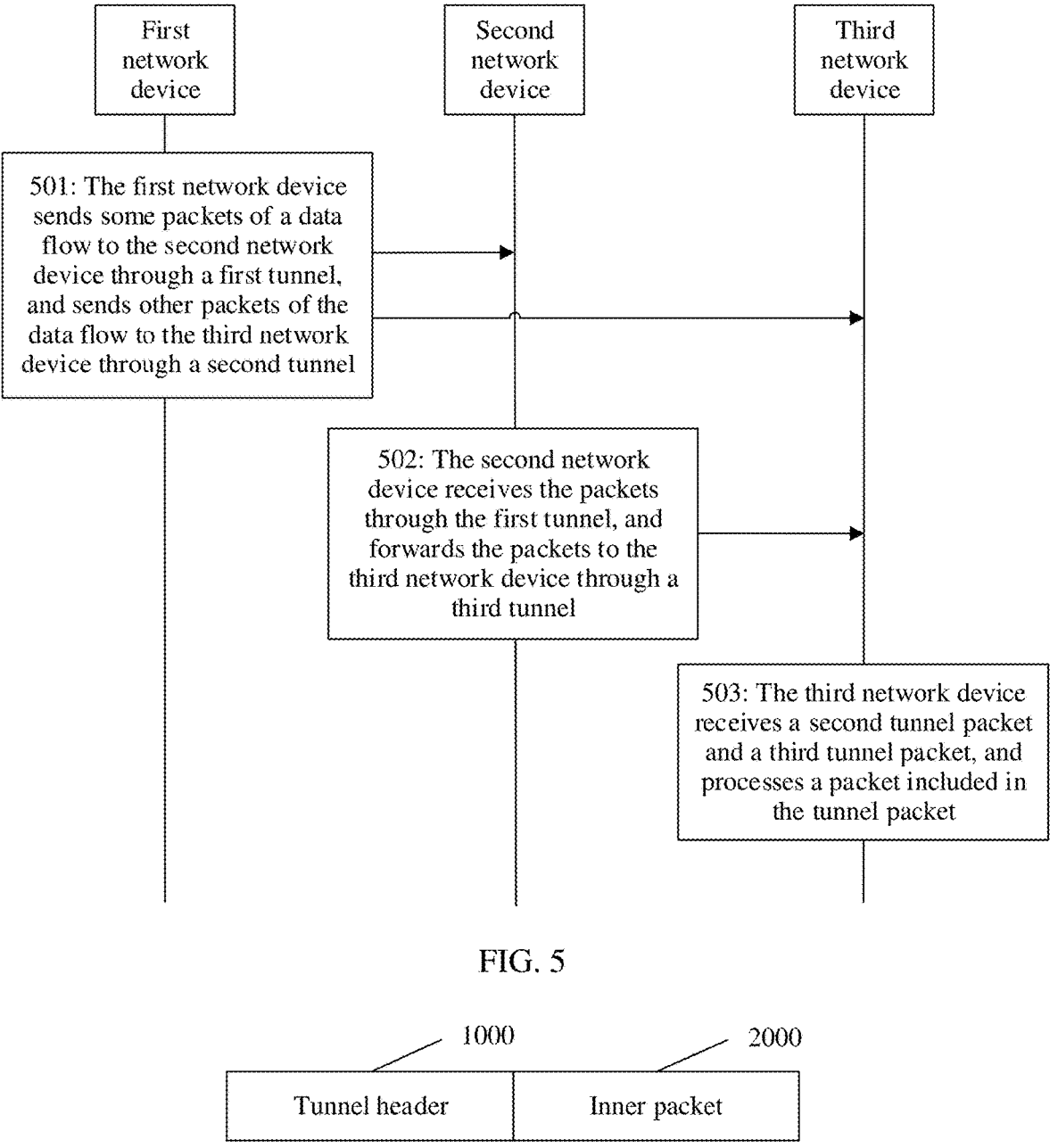
FIG. 5 is a flowchart of a packet processing method according to an embodiment of this application.
FIG. 6 is a schematic diagram of a tunnel packet format according to an embodiment of this application.

For detailed execution operations, refer to FIG. 5. FIG. 5 is a flowchart of a packet processing method according to an embodiment of this application. The method includes the following operations.

Operation 501: A first network device sends some packets of a data flow to a second network device through a first tunnel, and sends other packets of the data flow to a third network device through a second tunnel.

The first network device is located at a first site. The second network device and the third network device are located at a second site. The first site and the second site are connected through a wide area network. For example, as shown in FIG. 2, the first site may be a site 110, the second site may be a site 120, and the site 110 and the site 120 are connected through a wide area network 130. The first network device may be a gateway device 160. The second network device may be a gateway device 150. The third network device may be a gateway device 140. The gateway device 140 may be a primary gateway, and the gateway device 150 may be a secondary gateway. The first tunnel may be a tunnel A. The second tunnel may be a tunnel B. A and B shown in FIG. 2 indicate a tunnel header A and a tunnel header B respectively. The tunnel A and the tunnel B transmit packets based on different transmission paths. For example, the tunnel A transmits a packet based on a path 180, and the tunnel B transmits a packet based on a path 170. The gateway device 160 communicates with the gateway device 150 through the wide area network based on the tunnel A. The gateway device 160 communicates with the gateway device 140 through the wide area network based on the tunnel B.

The tunnel A or the tunnel B may be of a plurality of types. For example, the tunnel A or the tunnel B is a GRE tunnel. Alternatively, the tunnel A or the tunnel B is an IP in IP tunnel. The tunnel A and the tunnel B can be the same or different. For example, the tunnel A and the tunnel B are GRE tunnels. Alternatively, the tunnel A is a GRE tunnel, and the tunnel B is an IP in IP tunnel.

The data flow may be a service flow. For example, packets of the data flow have a same 5-tuple. The 5-tuple includes a source IP address, a destination IP address, a source port, a destination port, and a protocol number. The data flow may further include a plurality of service flows. For example, a plurality of packets of the data flow each have different 5-tuples, and each 5-tuple corresponds to one service flow. The packet of the data flow may be packets of a plurality of types, for example, an IP packet and an Ethernet packet.

The gateway device 160 may obtain the packet of the data flow in a plurality of manners. For example, the site 120 sends a plurality of packets to the gateway device 160. The gateway device 160 receives the plurality of packets to obtain the plurality of packets. For another example, the gateway device 160 may further adjust an order of the received plurality of packets to obtain a plurality of original packets. For example, if each of the packets received by the gateway device 160 carries a sequence number, and the gateway device 160 finds, by using the sequence number, that the plurality of received packets are out of order, the gateway device 160 may adjust an order of the plurality of packets based on the sequence number. The plurality of packets obtained by adjusting the order are the plurality of original packets obtained by the gateway device 160. For another example, the gateway device 160 may alternatively adjust the order of the received packets based on a specific field of the received packets. For example, if each of the packets received by the gateway device 160 is an IP packet, and a differentiated services code point (DSCP) field is set in an IP header of the IP packet, the gateway device 160 may adjust the order of the received packets based on a value of the DSCP field. For example, the gateway device 160 determines a priority of the packet based on the DSCP value, and adjusts the order of the packets based on the priority of the packet, to preferentially send a packet with a high priority.

When the gateway device 160 implements load balancing, the gateway device 160 may send some packets in the plurality of obtained packets to the gateway device 150 through the tunnel A, and send other packets in the plurality of obtained packets to the gateway device 140 through the tunnel B.

When the gateway device 160 implements another multipath optimization technology, the gateway device 160 may further implement the optimization technology based on the foregoing plurality of obtained packets to obtain to-be-sent packets. For example, if the gateway device 160 implements multipath FEC, the gateway device 160 generates a redundant packet based on the foregoing plurality of obtained original packets, and sends the original packets and the redundant packet through multiple paths. For example, the gateway device 160 sends the redundant packet to the gateway device 150 through the tunnel A, and sends the original packets to the gateway device 140 through the tunnel B. For another example, if the gateway device 160 implements multi-fed and selective receiving, the gateway device 160 may make a copy of each received original packet to obtain a double quantity of packets, and send the original packet and the copied packet through the multiple paths. For example, the gateway device 160 sends the copied packet to the gateway device 150 through the tunnel A, and the gateway device 160 sends the original packet to the gateway device 140 through the tunnel B.

To send some packets in the to-be-sent packets to the gateway device 150, the gateway device 160 adds a tunnel header of the tunnel A to each of the packets, to obtain a plurality of tunnel packets of the tunnel A. The first network device sets a destination address in the tunnel header of the tunnel A to an address of the gateway device 150, to send the tunnel packets of the tunnel A to the gateway device 150.

To send other packets in a plurality of to-be-sent packets to the gateway device 140, the gateway device 160 adds a tunnel header of the tunnel B to each of the other packets to obtain a plurality of tunnel packets of the tunnel B. The gateway device 160 sets a destination address in the tunnel header of the tunnel B to an address of the gateway device 140, to send the tunnel packets of the tunnel B to a third network device.

The to-be-sent packet is an inner packet of a tunnel packet. The tunnel packet includes an inner packet and an outer tunnel header. The tunnel header A and the tunnel header B can be the same. For example, when each of the tunnel A and the tunnel B is an IP in IP tunnel, each of the tunnel header A and the tunnel header B includes an outer IP header. For another example, when the tunnel A is an IP in IP tunnel and the tunnel B is a GRE tunnel, the tunnel header A includes an outer IP packet, and the tunnel header B further includes a GRE header.

The tunnel packet may include a sequence number. When the tunnel packet includes the sequence number, the gateway device 160 may add the sequence number to the tunnel header.

The tunnel packet may further include a flow identifier. When the tunnel packet includes the flow identifier, the gateway device 160 may add the flow identifier to the tunnel header. The gateway device 140 may distinguish between data flows based on flow identifiers. When the tunnel packet does not include the flow identifier, the gateway device may distinguish between data flows based on another field of the packet. For example, the gateway device distinguishes between the data flows based on a tuple of the inner packet.

The tunnel packet may further include an optimization technology identifier. The optimization technology identifier indicates an optimization technology used by the gateway device 160 for the inner packet included in the tunnel packet. When the tunnel packet includes the optimization technology identifier, the gateway device 160 may add the optimization technology identifier to the tunnel header. The gateway device 140 may distinguish between optimization technologies based on the optimization technology identifier in the tunnel header, to implement a corresponding optimization technology. When the tunnel packet does not include the optimization technology identifier, the gateway device may alternatively implement a corresponding optimization technology based on default configuration. For example, the gateway device 160 and the gateway device 140 implement load balancing in a first time period, and implement multi-fed and selective receiving in a second time period. For another example, the gateway device 160 and the gateway device 140 implement load balancing on a first data flow, and implement multi-fed and selective receiving on a second data flow.

The tunnel packet may further include a primary identifier/forwarding identifier. The forwarding identifier indicates a gateway device that receives a tunnel packet including a forwarding identifier to forward the tunnel packet. The primary identifier indicates a gateway device that receives a tunnel packet including a primary identifier to process the tunnel packet. When the tunnel packet includes the primary identifier/forwarding identifier, the gateway device 160 may add the primary identifier/forwarding identifier to the tunnel header. For example, the gateway device 160 adds a forwarding identifier to a tunnel header of a tunnel A of the first data flow, and adds a primary identifier to a tunnel header of a tunnel B of the first data flow. The gateway device 160 adds a primary identifier to a tunnel header of a tunnel A of the second data flow, and adds a forwarding identifier to a tunnel header of a tunnel B of the second data flow. In this case, the gateway device 140 forwards a received packet of the second data flow to the gateway device 150, and the gateway device 150 forwards a received packet of the first data flow to the gateway device 140. The gateway device 140 is responsible for processing the packet of the first data flow, and the gateway device 150 is responsible for processing the packet of the second data flow. The tunnel packet includes the primary identifier/forwarding identifier, so that processing loads of the gateway device 150 and the gateway device 140 can be balanced, and traffic can be distributed on a transmission path between the gateway device 140 and the site 110 and a transmission path between the gateway device 150 and the site 110. This prevents occurrence of a bandwidth bottleneck from the gateway device 140 or the gateway device 150 to an egress of the site 120. When multiple gateways include more than two gateways, for one data flow, a gateway device that sends a tunnel packet adds a primary identifier to a tunnel packet sent to one gateway, and adds a forwarding identifier to a tunnel packet sent to another gateway. When a tunnel packet does not include a primary identifier/forwarding identifier, a gateway receiving the tunnel packet may further perform a processing/forwarding operation based on configuration. For example, if the multiple gateways include a gateway A, a gateway B, and a gateway C, in the first time period, the gateway A may perform a processing operation, and each of the gateway B and the gateway C processes a forwarding operation. For another example, the gateway A performs a processing operation on the first data flow, the gateway B performs a processing operation on the second data flow, and the gateway C performs a processing operation on a third data flow.

Operation 502: The second network device receives the packets through the first tunnel, and forwards the packets to the third network device through a third tunnel.

Refer to FIG. 2. The first network device may be the gateway device 160, the second network device may be the gateway device 150, the third network device may be the gateway device 140, the first tunnel may be the tunnel A, and the third tunnel may be the tunnel C. A and C shown in FIG. 2 indicate tunnel headers of the tunnel A and the tunnel C respectively. The gateway device 150 receives a packet sent by the gateway device 160 through the tunnel A, and replaces the tunnel header A in the tunnel packet with the tunnel header C, to obtain a tunnel packet of the tunnel C. The gateway device 150 sets a destination address of the tunnel packet of the tunnel C to the address of the gateway device 140, to send the tunnel packet to the gateway device 140.

If the tunnel header A includes an optional field, the gateway device 150 sets an optional field of the tunnel header C based on the optional field included in the tunnel header A. For example, if the tunnel header A includes a sequence number, the tunnel header C also includes a sequence number, and the sequence number included in the tunnel header C is the same as the sequence number included in the corresponding tunnel header A. When the packet in the tunnel header A includes the sequence number, the gateway device 150 copies the sequence number included in the tunnel header A to the tunnel header C. For another example, if the tunnel header A includes a flow identifier, the tunnel header C also includes a flow identifier, and the flow identifier included in the tunnel header C is the same as the flow identifier included in the corresponding tunnel header A. When the tunnel header A includes the flow identifier, the gateway device 150 copies the flow identifier included in the tunnel header A to the tunnel header C. For another example, if the tunnel header A includes an optimization technology identifier, the tunnel header C may also include an optimization technology identifier. The gateway device 150 copies the optimization technology identifier included in the tunnel header A to the corresponding tunnel header C. For another example, if the tunnel header A includes a primary identifier/forwarding identifier, a value is a second value, indicating that the gateway device 150 receiving a tunnel packet should forward a packet included in the tunnel packet to the gateway device 140. In this case, the tunnel header C may also include the primary identifier/forwarding identifier. In this case, the gateway device 150 sets a value of the primary identifier/forwarding identifier included in the tunnel header C to a first value, indicating the gateway device 140 that receives a tunnel packet to process the tunnel packet. For example, if the gateway device 160 implements a load balancing optimization technology for the original packet, the gateway device 160 sets an optimization technology identifier to indicate that the optimization technology is load balancing. When receiving the tunnel packet, the gateway device 140 sends an original packet carried in the received tunnel packet to the site 110. For another example, if the gateway device 160 implements a multi-fed and selective receiving optimization technology for the original packet, the gateway device 160 sets an optimization technology identifier to indicate that the optimization technology is multi-fed and selective receiving. When receiving the tunnel packet, the gateway device 140 deletes a duplicate tunnel packet, and sends an original packet carried in a reserved tunnel packet to the site 110. For another example, if the gateway device 160 implements a multipath FEC optimization technology for the original packet, the gateway device 160 sets an optimization technology identifier to indicate that the optimization technology is multipath FEC. When receiving the tunnel packet, if the gateway device 140 finds that a packet loss or an error occurs in the original packet, the gateway device 140 implements FEC decoding based on the received original packet and the redundant packet to recover the original packet, and sends the recovered original packet to the site 110.

Operation 503: The third network device receives a second tunnel packet and a third tunnel packet, and processes an inner packet included in the tunnel packet.

Refer to FIG. 2. The first network device may be the gateway device 160, the second network device may be the gateway device 150, the third network device may be the gateway device 140, the second tunnel may be the tunnel B, and the third tunnel may be the tunnel C. B and C shown in FIG. 2 indicate tunnel headers of the tunnel B and the tunnel C respectively.

The gateway device 140 receives a tunnel packet of the tunnel B sent by the gateway device 160, and receives a tunnel packet of the tunnel C sent by the gateway device 150. The tunnel packet includes a tunnel header and an inner packet. After receiving the tunnel packet, the gateway device 140 implements an optimization technology corresponding to the gateway device 160, to recover the original packet based on the inner packet included in the tunnel packet, and sends the original packet to the site 110. For example, if the gateway device 160 implements a load balancing optimization technology, the inner packet included in the tunnel packet is the original packet. The gateway device 140 may directly send the inner packet included in the tunnel packet to the site 110. For another example, if the gateway device 160 implements a multi-fed and selective receiving optimization technology, one original packet corresponds to a plurality of inner packets. Correspondingly, the gateway device 140 may receive the plurality of tunnel packets corresponding to one original packet. The gateway device 140 deletes a duplicate tunnel packet, and sends only an inner packet included in a reserved tunnel packet to the site 110. For another example, if the gateway device 160 implements a multipath FEC optimization technology, the inner packet included in the tunnel packet may be an original packet, or may be a redundant packet. When the gateway device 140 determines that a packet loss or an error occurs in the original packet, the gateway device 140 implements FEC decoding based on an original correct packet and the redundant packet, to recover all original packets, and sends the original packets to the site 110. When the gateway device 140 determines that no packet loss or error occurs in the original packet, the gateway device 140 may directly send the original packet to a destination site. The gateway device 140 may further selectively send the original packet to the destination site based on a sequence number included in the tunnel header. For example, tunnel packets received by the gateway device 140 may be out of order. If the optimization technology is load balancing, the gateway device 140 reorders the received packets based on sequence numbers in both the tunnel header B and the tunnel header C, and sends the original packets to the destination site based on the reordered order. For another example, if the optimization technology is multi-fed and selective receiving, the gateway device 140 may receive tunnel packets with a duplicate sequence number. Therefore, the gateway device 140 deletes the packets with the duplicate sequence number, and sends only one original packet corresponding to the sequence number to the destination site. The gateway device 140 may further send, to the destination site based on the sequence number in the tunnel header, an original packet included in a tunnel packet that is not deleted.

If the tunnel header further includes another field, the gateway device 140 selectively sends the original packet to the site 110 with reference to the another field. For example, if the tunnel header further includes a flow identifier, the gateway device 140 distinguishes between different data flows based on the flow identifier, and implements an optimization technology for each data flow. For example, if the optimization technology is load balancing, the gateway device 140 sends an original packet of the first data flow to the site 110 based on a sequence number carried in a tunnel packet of the first data flow, and the gateway device 140 sends an original packet of the second data flow to the site 110 based on a sequence number carried in a tunnel packet of the second data flow. For another example, if the tunnel header further includes an optimization technology identifier, the gateway device 140 selectively sends the original packet to the site 110 based on an optimization technology indicated by the identifier. For example, if the optimization technology identifier indicates that an optimization technology applied by the gateway device 160 to the tunnel packet is load balancing, the gateway device 140 sends the original packet to the destination site based on the sequence number included in the tunnel packet. When the tunnel packet does not include the sequence number, the gateway device 140 may further send the packet based on a sequence number included in the inner packet. For another example, if the optimization technology identifier indicates that an optimization technology applied by the gateway device 160 to the tunnel packet is multi-fed and selective receiving, the gateway device 140 deletes the tunnel packets with the duplicate sequence number, and sends only one original packet for each sequence number to the destination site. When the tunnel packet does not include the sequence number, the gateway device 140 may further delete a duplicate packet based on a sequence number included in the inner packet or another field included in another packet.

An order of the operations of the packet processing method provided in this embodiment of this application may be appropriately adjusted. For example, the third network device may receive the second tunnel packet in operation 503 before operation 502. Any method variation readily figured out by any person skilled in the art within the technical scope disclosed in this application shall fall within the protection scope of this application. Therefore, Details are not described herein again.

In conclusion, according to the packet processing method provided in this embodiment of this application, the first network device obtains a plurality of optimized packets based on the plurality of original packets by using the multipath optimization technology, converts some packets in the plurality of obtained optimized packets into first tunnel packets, and sends the first tunnel packets to a secondary gateway, and converts other packets in the plurality of optimized packets into second tunnel packets, and sends the second tunnel packets to the primary gateway. Then, the secondary gateway converts the received first tunnel packets into third tunnel packets and sends the third tunnel packets to the primary gateway. The primary gateway implements a corresponding optimization technology based on each of the received second tunnel packet and third tunnel packet, to selectively send the original packet included in the tunnel packet to the destination site. To be specific, the first network device may obtain the original packets through the multiple paths, and the primary gateway may obtain packets received by all gateways that receive the tunnel packet, to implement the multipath optimization technology. Therefore, the method implements the wide area network multipath optimization technology in the multi-gateway scenario.

In operation 501, the gateway device 160 may use a plurality of methods to determine whether the packet should be sent to the gateway device 150 or the gateway device 140. For example, for each to-be-sent packet, the gateway device 160 randomly selects either the gateway device 150 or the gateway device 140 as a destination gateway, to send the to-be-sent packet to the destination gateway. For another example, the gateway device 150 and the gateway device 140 are alternately selected by the gateway device 160 as the destination gateway. For example, when sending an odd-numbered packet, the gateway device 160 sends the packet to the gateway device 150. When sending an even-numbered packet, the gateway device 160 sends the packet to the gateway device 140. For another example, the gateway device 160 may further group the plurality of to-be-sent packets, send packets of a specified group to the gateway device 150, and send packets of another specified group to the gateway device 140. For example, when the gateway device 160 obtains the double quantity of packets based on multi-fed and selective receiving, the gateway device 160 sends an original packet in the double quantity of packets to the gateway device 140, and sends a copied packet in the double quantity of packets to the gateway device 150. For example, when obtaining a new packet based on multipath FEC, the gateway device 160 sends an original packet in the new packet to the gateway device 150, and sends a redundant packet in the new packet to the gateway device 140.

When the tunnel header includes the sequence number, the first network device may set, based on an order in which the first network device obtains the original packets, sequence numbers of tunnel packets corresponding to the original packets. For example, values of the sequence numbers of the tunnel packets are in an ascending order based on an order in which the first network device obtains the original packets corresponding to the tunnel packets. For another example, values of the sequence numbers of the tunnel packets are in a descending order based on an order in which the first network device obtains the original packets corresponding to the tunnel packets. The following uses an example in which the sequence numbers of the tunnel packets are in an ascending order based on the order in which the first network device obtains the original packets corresponding to the tunnel packets.

For example, as shown in FIG. 2, the gateway device 160 implements the load balancing optimization technology, and sends the obtained four original packets to the gateway device 140 and the gateway device 150. The gateway device 160 adds a tunnel header A to each of a first original packet and a third original packet in the obtained four original packets, to obtain two tunnel packets of the tunnel A (e.g., tunnel A packets), and sends the two tunnel packets to the gateway device 150. The gateway device 160 adds a tunnel header B to each of a second original packet and a fourth original packet in the obtained four original packets, to obtain two tunnel packets of the tunnel B (e.g., tunnel B packets), and sends the two tunnel packets to the gateway device 140. The gateway device 160 sets a value of a sequence number in a tunnel A packet corresponding to the first original packet to 1. The gateway device 160 sets a value of a sequence number in a tunnel B packet corresponding to the second original packet to 2. The gateway device 160 sets a value of a sequence number in a tunnel A packet corresponding to the third original packet to 3. The gateway device 160 sets a value of a sequence number in a tunnel B packet corresponding to the fourth original packet to 4. In other words, a sequence number of a tunnel packet corresponding to an original packet that is obtained by the first network device later is greater than a sequence number of a tunnel packet corresponding to an original packet that is obtained by the first network device earlier.

For another example, as shown in FIG. 3, the gateway device 160 implements multi-fed and selective receiving, generates four copied packets based on the obtained four original packets, sends the four original packets to the gateway device 140 through the tunnel B, and sends the four copied packets to the gateway device 150 through the tunnel A. The gateway device 160 sets values of sequence numbers of tunnel A packets corresponding to the first original packet to the fourth original packet to 1, 2, 3, and 4 respectively. Tunnel B packets corresponding to the four copied packets have the same sequence numbers as tunnel packets of the original packets. To be specific, a sequence number of a tunnel packet of a copied packet of the first original packet is 1, a sequence number of a tunnel packet of a copied packet of the second original packet is 2, a sequence number of a tunnel packet of a copied packet of the third original packet is 3, and a sequence number of a tunnel packet of a copied packet of the fourth original packet is 4.

For another example, as shown in FIG. 4, the gateway device 160 implements FEC encoding, generates the two redundant packets through encoding based on the obtained four original packets, sends the four original packets to the gateway device 140 through the tunnel B, and sends the two redundant packets to the gateway device 150 through the tunnel A. The gateway device 160 sets values of sequence numbers of tunnel A packets corresponding to the first original packet to the fourth original packet to 1, 2, 3, and 4 respectively. The gateway device 160 may independently set a sequence number of the redundant packet, because the gateway device 160 may add an identifier of the redundant packet to a tunnel header, to distinguish the redundant packet from the original packet. For example, the gateway device 160 sets sequence numbers of the two redundant packets to 1 and 2.

When the tunnel packet includes the sequence number, a gateway that receives the tunnel packet may further implement an optimization technology based on the sequence number. For example, a primary gateway or a secondary gateway that receives the tunnel packet may determine, based on the sequence number, whether a packet loss occurs in a transmission process of the tunnel packet. Once the packet loss is detected, the gateway that receives the tunnel packet may quickly initiate a retransmission request, to prompt the gateway that sends the tunnel packet to retransmit a lost tunnel packet, without waiting for the destination site to detect the packet loss and trigger packet loss retransmission. This can further improve transmission quality of the data flow. When the tunnel packet includes the sequence number, the primary gateway may send the original packet to the destination site based on the sequence number. For example, the primary gateway sends the original packets to the destination site in an ascending order of sequence numbers, so that an order in which the packets are sent to the destination site is consistent with an order in which a source site sends the packets. This prevents impact of an out-of-order issue that may be caused by the multipath optimization technology on the transmission quality of the data flow.

The first network device may add the sequence number to the tunnel header in a plurality of manners. For example, the tunnel header includes an IP header, and the first network device includes the sequence number field in an optional field of the IP header. For example, the gateway device 160 adds one TLV to an IP header in the tunnel header A, to include the sequence number in the TLV. For example, the gateway device 160 adds one TLV to an IP header in the tunnel header B, to include the sequence number in the TLV. For another example, the tunnel header may further include another header, for example, a GRE header, and the first network device includes a sequence number field in the GRE header. For example, the gateway device 160 includes a sequence number field in a GRE header in the tunnel header A. For example, the gateway device 160 includes a sequence number field in a GRE header in the tunnel header B. For another example, the first network device may further add one header to the tunnel header, to include a sequence number field in the newly added header.

When the tunnel header includes the optimization technology, the first network device may use several bits to indicate the optimization technology. For example, the first network device uses three bits to indicate eight optimization technologies. For example, bits 000 indicate load balancing, bits 001 indicate multi-fed and selective receiving, and bits 002 indicate multipath FEC. The first network device may add, to the tunnel header in a plurality of manners, a bit indicating the optimization technology, to include the optimization technology identifier. For example, the tunnel header includes an IP header, and the first network device includes the optimization technology identifier in an optional field of the IP header. For example, the gateway device 160 adds one TLV to an IP header in the tunnel header A, to include the optimization technology identifier in the TLV. For example, the gateway device 160 adds one TLV to the IP header in the tunnel header B, to include the optimization technology identifier in the TLV. For another example, the tunnel header may further include another header, for example, a GRE header, and the first network device includes the optimization technology identifier in the GRE header. For example, the gateway device 160 includes the optimization technology identifier in a GRE header in the tunnel header A. For example, the gateway device 160 includes the optimization technology identifier in a GRE header in the tunnel header B. For another example, the first network device may further add one header to the tunnel header, to include the optimization technology identifier in the newly added header.

When the tunnel header includes the flow identifier, the first network device may use several bits to indicate the flow identifier. For example, the first network device uses eight bits to indicate 256 data flows. The first network device may add, to the tunnel header in a plurality of manners, a bit indicating the flow identifier, to include the flow identifier. For example, the tunnel header includes an IP header, and the first network device includes the flow identifier in an optional field of the IP header. For example, the gateway device 160 adds one TLV to an IP header in the tunnel header A, to include the flow identifier in the TLV. For example, the gateway device 160 adds one TLV to the IP header in the tunnel header B, to include the flow identifier in the TLV. For another example, the tunnel header may further include another header, for example, a GRE header, and the first network device includes the flow identifier in the GRE header. For example, the gateway device 160 includes the flow identifier in a GRE header in the tunnel header A. For example, the gateway device 160 includes the flow identifier in a GRE header in the tunnel header B. For another example, the first network device may further add one header to the tunnel header, to include the flow identifier in the newly added header.

The first network device may further use a specific field to indicate the flow identifier. For example, the first network device distinguishes between different data flows by using IP addresses. For example, the first network device determines that original packets having a same destination IP belong to one type of data flow. The first network device adds one field to the tunnel header to carry a destination IP, and the primary gateway distinguishes between the data flows based on the IP field. The first network device may add, to the tunnel header in a plurality of manners, a bit indicating the flow identifier, to include the flow identifier. For example, the tunnel header includes an IP header, and the first network device includes the specific field in an optional field of the IP header. For example, the gateway device 160 adds one TLV to an IP header in the tunnel header A, to include the specific field in the TLV. For example, the gateway device 160 adds one TLV to an IP header in the tunnel header B, to include the specific field in the TLV. For another example, the tunnel header may further include another header, for example, a GRE header, and the first network device includes the specific field in the GRE header. For example, the gateway device 160 includes the specific field in a GRE header in the tunnel header A. For example, the gateway device 160 includes the specific field in a GRE header in the tunnel header B. For another example, the first network device may further add one header to the tunnel header, to include the specific field in the newly added header.

One data flow indicated by one flow identifier may include one or more service flows. For example, one data flow indicated by one flow identifier may include only one group of original packets having a same 5-tuple. For another example, one data flow indicated by one flow identifier may include original packets having different 5-tuples, where each 5-tuple indicates one service flow.

When the tunnel header includes the primary identifier/forwarding identifier, the first network device may use several bits to indicate the primary identifier/forwarding identifier. For example, the first network device uses one bit to indicate the primary identifier/forwarding identifier. When the bit is the first value, it indicates that a tunnel packet carrying the bit includes the primary identifier; or when the bit is the second value, it indicates that a tunnel packet carrying the bit includes the forwarding identifier. For example, the first value may be 1, and the second value may be 0. The first network device may add the bit to the tunnel header in a plurality of manners, to include the primary identifier/forwarding identifier. For example, the tunnel header includes an IP header, and the first network device includes the primary identifier/forwarding identifier in an optional field of the IP header. For example, the gateway device 160 adds one TLV to an IP header in the tunnel header A, to include the primary identifier/forwarding identifier in the TLV. For example, the gateway device 160 adds one TLV to the IP header in the tunnel header B, to include the primary identifier/forwarding identifier in the TLV. For another example, the tunnel header may further include another header, for example, a GRE header, and the first network device includes the primary identifier/forwarding identifier in the GRE header. For example, the gateway device 160 includes the primary identifier/forwarding identifier in a GRE header in the tunnel header A. For example, the gateway device 160 includes the primary identifier/forwarding identifier in a GRE header in the tunnel header B. For another example, the first network device may further add one header to the tunnel header, to include the primary identifier/forwarding identifier in the newly added header.

The tunnel header may include one or more fields.

For example, the tunnel header includes only a sequence number field. Multiple gateways that receive the tunnel packet may determine, based on configuration, whether to perform a processing operation or a forwarding operation. For example, one gateway in the multiple gateways is a primary gateway by default, and another gateway in the multiple gateways is a secondary gateway by default. For another example, one gateway in the multiple gateways is a primary gateway of the first data flow by default, and another gateway in the multiple gateways is a primary gateway of the second data flow by default. The multiple gateways may distinguish between the first data flow and the second data flow based on a tuple of an inner packet included in the tunnel packet. For example, the tuple may be a 2-tuple including a source IP and a destination IP, or the tuple may be a 5-tuple including a source IP, a destination IP, a source port, a destination port, and a protocol type. A gateway that sends the tunnel packet and a primary gateway that receives the tunnel packet may implement the optimization technology based on the configuration. For example, the gateway that sends the tunnel packet and the primary gateway implement the load balancing optimization technology for all packets. For another example, the gateway that sends the tunnel packet and the primary gateway implement the load balancing optimization technology for a packet obtained in the first time period, and implement the multi-fed and selective receiving optimization technology for a packet obtained in the second time period.

For another example, the tunnel header includes a sequence number and a flow identifier. Data flows indicated by different flow identifiers may use a same sequence number. The primary gateway distinguishes between data flows based on the flow identifier, and implements the optimization technology for the data flows indicated by flow identifiers based on the sequence number.

For another example, the tunnel header includes an optimization technology identifier. In this case, a gateway that sends the tunnel packet may implement different optimization technologies in different time periods. For example, the gateway implements load balancing for an obtained packet in the morning, and implements multi-fed and selective receiving for an obtained packet in the afternoon. The primary gateway implements different optimization technologies for a received tunnel packet based on the optimization technology identifier. When the tunnel packet received by the primary gateway includes the optimization technology identifier, a tunnel packet received by the secondary gateway may include the optimization technology identifier, or may not include the optimization technology identifier. When the tunnel packet received by the secondary gateway does not include the optimization technology identifier, the primary gateway may implement a corresponding optimization technology based on an optimization technology identifier included in another tunnel packet received by the primary gateway. Both the another tunnel packet received by the primary gateway and the tunnel packet that is received by the secondary gateway and that does not include the optimization technology identifier belong to a same data flow.

For another example, the tunnel header includes a primary identifier/forwarding identifier. In this case, a gateway that sends the tunnel packet may adjust the primary identifier/forwarding identifier in the tunnel packet, to balance processing loads of the primary gateway and the secondary gateway.

For another example, the tunnel header includes a sequence number, a flow identifier, and an optimization technology identifier. In this case, data flows indicated by different flow identifiers may use a same sequence number, and a gateway that sends the tunnel packet may implement different optimization technologies for different data flows. The primary gateway distinguishes between data flows based on the flow identifier. For each data flow, the primary gateway implements a corresponding optimization technology based on the optimization technology identifier.

For another example, the tunnel header includes a sequence number, a flow identifier, an optimization technology identifier, and a primary identifier/forwarding identifier. In this case, a gateway that sends the tunnel packet may select different primary/secondary gateways for different data flows. For example, as shown in FIG. 2, the gateway device 160 sends the packet to the gateway device 150 through the tunnel A, and the gateway device sends the packet to the gateway device 140 through the tunnel B. The gateway device 160 may select the gateway device 140 as a primary gateway of the first data flow, and select the gateway device 150 as a primary gateway of the second data flow. For example, the gateway device 160 sets the primary identifier/forwarding identifier in the tunnel A packet of the first data flow to the second value, and sends the tunnel packet to the gateway device 150. The gateway device 160 sets the primary identifier/forwarding identifier in a tunnel B packet of the first data flow to the first value, and sends the tunnel packet to the gateway device 140. The gateway device 160 sets the primary identifier/forwarding identifier in a tunnel A packet of the second data flow to the first value, and sends the tunnel packet to the gateway device 150. The gateway device 160 sets the primary identifier/forwarding identifier in the tunnel B packet of the second data flow to the second value, and sends the tunnel packet to the gateway device 140. The gateway device 150 and the gateway device 140 distinguish between the first data flow and the second data flow based on the flow identifier. The gateway device 140 converts the tunnel A packet of the second data flow into a tunnel C packet, and sends the tunnel packet to the gateway device 150 through the tunnel C. The gateway device 150 implements a corresponding optimization technology for the second data flow based on the optimization technology identifier. The gateway device 150 converts the tunnel B packet of the first data flow into the tunnel C packet, and sends the tunnel packet to the gateway device 140 through the tunnel C. The gateway device 140 implements a corresponding optimization technology for the first data flow based on the optimization technology identifier. The tunnel C packet includes a sequence number and a flow identifier. The sequence number is the same as the sequence number included in the tunnel A packet or the tunnel B packet that corresponds to the tunnel C packet. The flow identifier is the same as the flow identifier included in the tunnel A packet or the tunnel B packet that corresponds to the tunnel C packet. The tunnel C packet may further include an optimization technology identifier, and the optimization technology identifier is the same as the optimization technology identifier included in the tunnel A packet or the tunnel B packet that corresponds to the tunnel C packet. When the tunnel C packet does not include the optimization technology identifier, the primary gateway may implement a corresponding optimization technology based on an optimization technology identifier included in another tunnel packet of the data flow received by the primary gateway. The tunnel C packet may further include a primary identifier/forwarding identifier, where the primary identifier/forwarding identifier is the first value. When the tunnel C packet does not include the primary identifier/forwarding identifier, the primary gateway may determine, based on another method, to implement the optimization technology for the tunnel C packet. For example, because the tunnel packet is the tunnel C packet, a gateway device that receives the tunnel packet implements the optimization technology for the tunnel packet.

A field included in the tunnel header may further be in another combination form. Details are not described herein.

Figure 7:
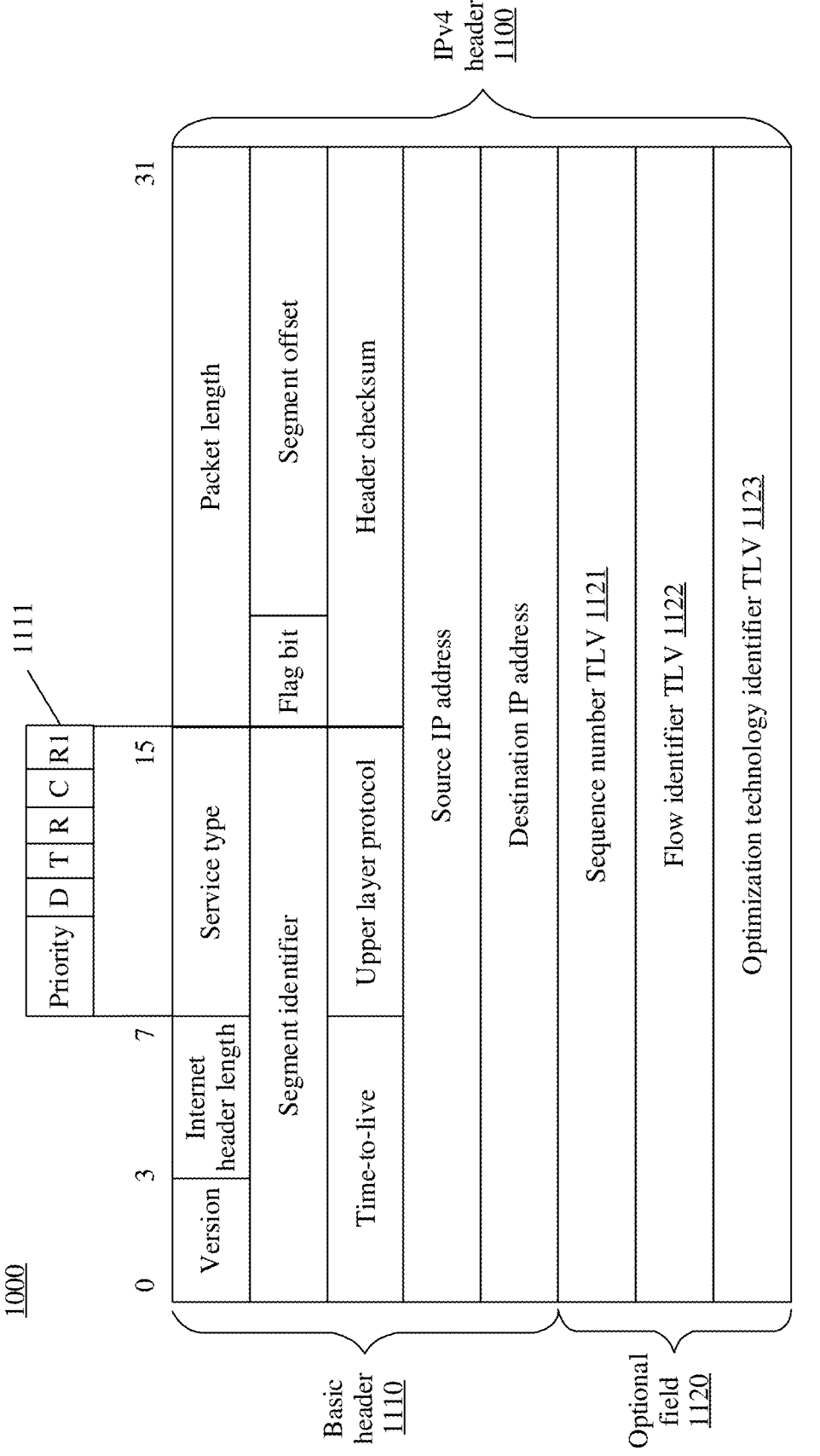
FIG. 7 is a schematic diagram of a tunnel header format according to an embodiment of this application.
Figure 8:
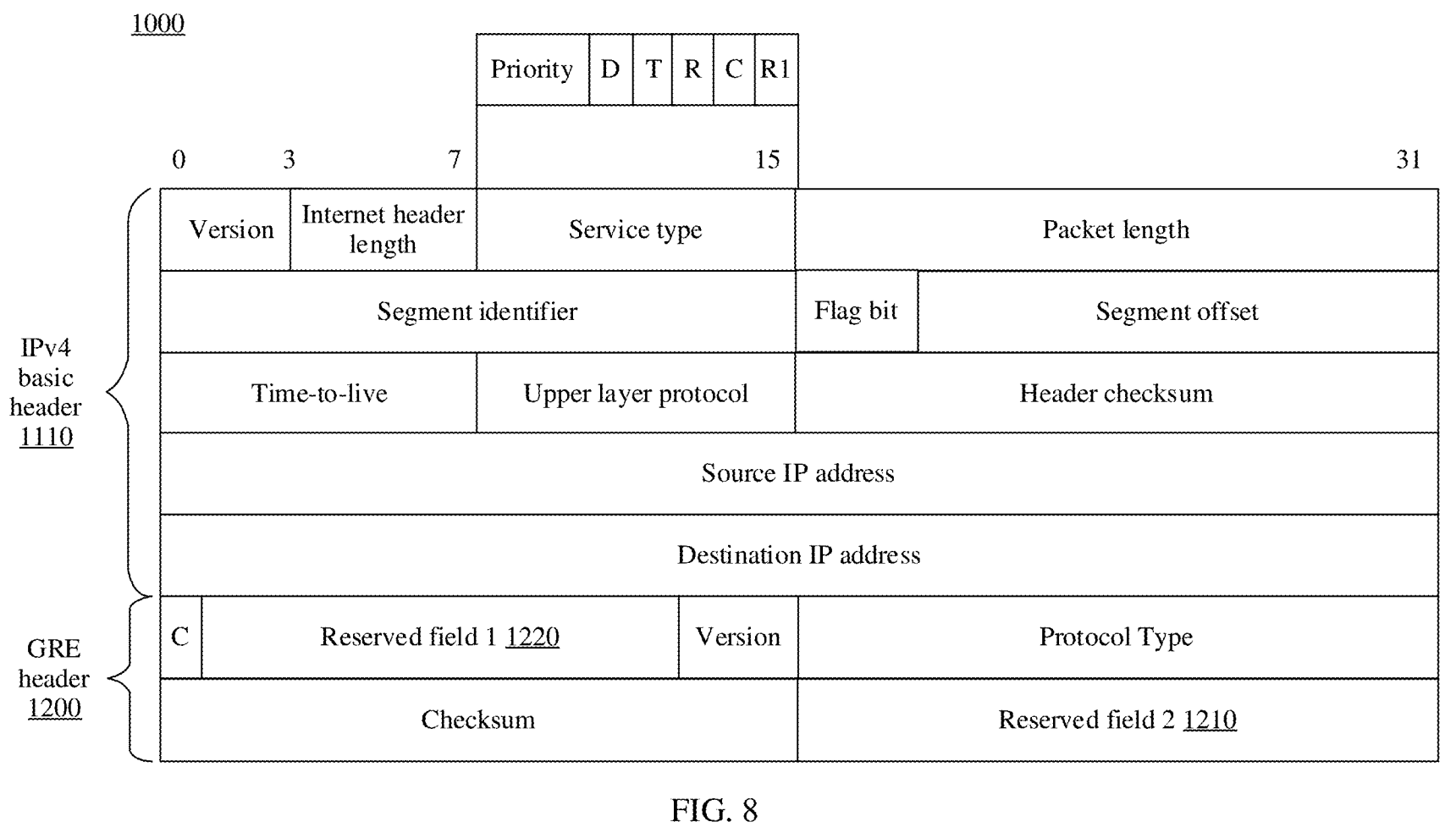

FIG. 6 to FIG. 10 show several reference formats of a tunnel header. FIG. 6 is a schematic diagram of a tunnel packet. FIG. 7 is a schematic diagram of a tunnel header. The tunnel header carries the foregoing fields based on an option of an IP header. FIG. 8 is another schematic diagram of a tunnel header. The tunnel header carries the foregoing fields based on a GRE header. FIG. 9 shows another tunnel header. The tunnel header carries the foregoing fields based on a newly added header. FIG. 10 shows a format of a TLV used by the tunnel header shown in FIG. 7.

FIG. 6 is the schematic diagram of the tunnel packet. The tunnel packet includes a tunnel header 1000 and an inner packet 2000. The inner packet 2000 is a packet received by a gateway that sends the tunnel packet from a source site, or a packet generated based on the received packet. The inner packet 2000 may be packets of a plurality of types, for example, an IP packet and an Ethernet packet.

FIG. 7 is a schematic diagram of the tunnel header 1000. The tunnel header 1000 includes an internet protocol version 4 (IPv4) header 1100. The IPv4 header 1100 includes a basic header 1110 and an optional field 1120. The optional field 1120 is an extension field newly added to the IP header in this embodiment of this application. For example, a sequence number type length value (TLV) 1121 is used to carry a sequence number. For another example, a flow identifier TLV 1122 is used to carry a flow identifier. For another example, an optimization technology identifier TLV 1123 is used to carry an optimization technology identifier. For a TLV format, refer to FIG. 10. The TLV field includes a type (T) 610, a length (L) 620, and a value (V) 630. If values of the type 610 are different, corresponding values 630 indicate different meanings. For example, if a value of the type 610 T=1 indicates that the TLV is a sequence number TLV, a sequence number is stored in the value 630. For another example, if a value of the type 610 T=2 indicates that the TLV is a flow identifier TLV, a flow identifier is stored in the value 630. For another example, if a value of the type 610 T=3 indicates that the TLV is an optimization technology identifier TLV, an optimization technology identifier is stored in the value 630. The type 610 and the length 620 are of a fixed length, for example, each occupies one byte. The value 630 is of a variable length. A value of the length 620 is a sum of bytes occupied by the type 610, the length 620, and the value 630. For example, in the TLV shown in FIG. 10, the type 610 occupies one byte, the length 620 occupies one byte, and the value 630 occupies two bytes. In this case, the entire TLV occupies 4 bytes, and the value of the length 620 is 4. In addition, a field R1 1111 in the basic header 1110 is a reserved field. In this embodiment of this application, the field may be used to carry the primary identifier/forwarding identifier. For example, the gateway that sends the tunnel packet sets the field in a tunnel packet sent to a primary gateway to 1, and sets the field in a tunnel packet sent to a secondary gateway to 0.

FIG. 8 shows another schematic diagram of the tunnel header 1000. The tunnel header 1000 includes an IPv4 basic header 1110 and a GRE header 1200. In this embodiment of this application, a field in the GRE header 1200 is used to carry fields in this embodiment of this application. For example, a sequence number is carried based on a reserved field 2 1210. For another example, a flow identifier, an optimization technology identifier, and a primary identifier/forwarding identifier are carried based on a reserved field 1 1220. The reserved field 1 1220 occupies 12 bits from 1 to 12 in the GRE header. In this embodiment of this application, the 12 bits may be allocated to the flow identifier, the optimization technology identifier, and the primary identifier/forwarding identifier. For example, total three bits from 2 to 4 are used to carry the optimization technology identifier, total eight bits from 4 to 12 are used to carry the flow identifier, and remaining one bit is used to carry the primary identifier/forwarding identifier.

FIG. 9 shows another schematic diagram of the tunnel header 1000. The tunnel header 1000 includes an IPv4 basic header 1110 and a newly added header 1300. In this embodiment of this application, the newly added header 1300 is used to carry field in this embodiment of this application. For example, 1310 is used to carry a sequence number, 1320 is used to carry a primary identifier/forwarding identifier, 1340 is used to carry a flow identifier, and 1350 is used to carry an optimization technology identifier. To maintain 4-byte alignment of the header, the newly added header includes a reserved field 1330.

FIG. 7 to FIG. 9 only provide several reference formats of the tunnel header, and the tunnel header may alternatively be of a packet format of another type. For example, the IP header in FIG. 7 to FIG. 9 may alternatively be an internet protocol version 6 (IPv6) header. For another example, the GRE header in FIG. 8 may alternatively be a GRE header in another format. For another example, the GRE header may be another tunnel header. For another example, in the tunnel header shown in FIG. 9, the GRE header may further exist between the IPv4 basic header 1110 and the newly added header 1300. Details are not described herein.

A format of a tunnel header A may be the same as a format of a tunnel header B. For example, the format of the tunnel header A and the format of the tunnel header B are both shown in FIG. 7. The format of the tunnel header A may alternatively be different from the format of the tunnel header B. For example, the format of a tunnel header A is shown in FIG. 7, and the format of a tunnel header B is shown in FIG. 8.

A format of a tunnel header C may be the same as the format of the tunnel header A. For example, the format of the tunnel header C and the format of the tunnel header A are both shown in FIG. 7. The format of the tunnel header C may alternatively be different from the format of the tunnel header A. For example, the format of the tunnel header C is shown in FIG. 8, and the format of the tunnel header A is shown in FIG. 7.

Correspondingly, a multipath optimization technology may further be implemented on a reverse transmission path in a multi-gateway scenario.

For example, FIG. 11 shows a technical solution for implementing load balancing on a reverse transmission path in a dual-gateway scenario. A gateway device 140 receives four packets sent by a site 110. The gateway device 140 sends a first packet and a second packet to a gateway device 150 through a tunnel D. The gateway device 140 sends a third packet and a fourth packet to a gateway device 160 through a tunnel E. When receiving the first packet and the second packet through the tunnel D, the gateway device 150 forwards the two packets to the gateway device 160 through a tunnel F. The gateway device 160 sends, to a site 120, the four packets received through multiple paths. In FIGS. 11, D, E, and F indicate tunnel headers of the tunnel D, the tunnel E, and the tunnel F respectively. The gateway device 140 sends the four packets through the two paths, and the gateway device 150 forwards the received two packets to the gateway device 160. Therefore, the gateway device 160 may receive the packets sent by the gateway device 140 through two paths, and send the packets to a destination site. Therefore, this solution implements load balancing in the dual-gateway scenario, so that a multipath transmission capability can be fully utilized for a data flow, and transmission quality of the data flow can be improved.

For another example, FIG. 12 shows a technical solution for implementing multi-fed and selective receiving on a reverse transmission path in a dual-gateway scenario. A gateway device 140 receives four packets sent by a site 110. The gateway device 140 makes a copy of each packet. The gateway device 140 sends four copied packets to a gateway device 150 through a tunnel D. The gateway device 140 sends the four original packets to a gateway device 160 through a tunnel E. When receiving the copied packets through the tunnel D, the gateway device 150 forwards the copied packets to the gateway device 160 through a tunnel F. Because a packet loss may occur on a transmission path, the gateway device 160 may receive only a first original packet, a second original packet, and a third original packet, and the gateway device 150 may receive only a second copied packet, a third copied packet, and a fourth copied packet. The gateway device 160 deletes duplicate packets, and sends the first original packet, the second original packet, the third original packet, and the fourth original packet that are not duplicate to a site 120. In FIGS. 12, D, E, and F indicate tunnel headers of the tunnel D, the tunnel E, and the tunnel F respectively. This solution implements multi-fed and selective receiving in the dual-gateway scenario. This can prevent a packet loss that may exist in a transmission link, and improve transmission quality of a data flow.

For another example, FIG. 13 shows a technical solution for implementing multipath FEC on a reverse transmission path in a dual-gateway scenario. A gateway device 140 receives four packets sent by a site 110. The gateway device 140 implements FEC encoding based on the four packets to generate two redundant packets. The gateway device 140 sends the two redundant packets to a gateway device 150 through a tunnel D. The gateway device 140 sends the four original packets to a gateway device 160 through a tunnel E. When receiving the redundant packets through the tunnel D, the gateway device 150 forwards the redundant packets to the gateway device 160 through a tunnel F. Because a packet loss or a link error may occur on the transmission path, the gateway device 160 may receive only a first original correct packet, a second original correct packet, a third original correct packet, and the two redundant packets. The gateway device 160 performs FEC decoding based on the received packets to recover a fourth original packet, and sends the four original packets to a site 120. In FIGS. 13, D, E, and F indicate tunnel headers of the tunnel D, the tunnel E, and the tunnel F respectively. This solution implements multipath FEC in the dual-gateway scenario. This can prevent a packet loss and a link error that may exist in a transmission link, and improve transmission quality of a data flow.

The tunnel D and the tunnel C may be a same tunnel, or may be different tunnels. For example, the tunnel D and the tunnel C are the same tunnel, the gateway device 150 sends a tunnel packet to the gateway device 140 based on the tunnel, and the gateway device 140 sends the tunnel packet to the gateway device 150 based on the tunnel. For another example, the tunnel D and the tunnel C are two different tunnels. The gateway device 150 sends a tunnel packet to the gateway device 140 based on the tunnel C, and the gateway device 140 sends a packet to the gateway device 150 based on the tunnel D. Similarly, the tunnel A and the tunnel F may be a same tunnel, or may be two different tunnels. Similarly, the tunnel B and the tunnel E may be a same tunnel, or may be two different tunnels.

Specific operations of implementing the multipath optimization technology on the reverse transmission path in the dual-gateway scenario are similar to operations of the method shown in FIG. 5. Details are not described herein again.

The following provides apparatus embodiments of this application that may be used to execute the method embodiment of this application. For details not disclosed in the apparatus embodiments of this application, refer to the method embodiment of this application.

FIG. 14 is a schematic diagram of a logical structure of a network device 1400 according to an embodiment of this application. The network device 1400 may be a first network device in a packet processing system, or a functional component of the first network device. The packet processing system includes the first network device, a second network device, and a third network device. The first network device is located at a first site. The second network device and the third network device are located at a second site. The first site and the second site are connected through a wide area network. Refer to FIG. 14. The network device 1400 includes an obtaining module 1410 and a sending module 1420. The obtaining module 1410 is configured to obtain the packet of the data flow that is sent in operation 501 in the embodiment shown in FIG. 5. The sending module 1420 is configured to perform the sending operation in operation 501 in the embodiment shown in FIG. 5. Details are as follows:

The obtaining module 1410 is configured to obtain a to-be-sent packet. The to-be-sent packet includes a first packet and a second packet. The first packet and the second packet belong to a same data flow.

The obtaining module 1410 may obtain the to-be-sent packet by using a plurality of methods. For example, the obtaining module 1410 receives a packet sent by the first site in which the obtaining module 1410 is located, to obtain the to-be-sent packet. For another example, the obtaining module 1410 implements an optimization technology based on a received packet, to obtain the to-be-sent packet. For example, the obtaining module 1410 makes a plurality of copies of a received packet to obtain the to-be-sent packet. For another example, the obtaining module 1410 implements FEC encoding based on a received packet, to generate a redundant packet. In this case, the to-be-sent packet obtained by the obtaining module 1410 includes the received original packet and the generated redundant packet.

The sending module 1420 is configured to send the first packet to a second network device through a first tunnel, and send the second packet to a third network device through a second tunnel.

In an embodiment, the sending module 1420 is further configured to: add a first sequence number to a tunnel packet that belongs to the first tunnel and carries the first packet, and add a second sequence number to a tunnel packet that belongs to the second tunnel and carries the second packet.

In an embodiment, the tunnel packet that belongs to the first tunnel and carries the first packet includes a flow identifier, and the tunnel packet that belongs to the second tunnel and carries the second packet includes a flow identifier. The flow identifier is used to identify a data flow to which each of the first packet and the second packet belongs.

In an embodiment, the tunnel packet that belongs to the second tunnel and carries the second packet includes a primary identifier. The primary identifier indicates the third network device to process the second packet.

In an embodiment, the tunnel packet that belongs to the first tunnel and carries the first packet includes a forwarding identifier. The forwarding identifier indicates the second network device to forward the first packet.

In an embodiment, the tunnel packet that belongs to the second tunnel and carries the second packet includes an optimization technology identifier. The optimization technology identifier indicates the third network device to process the first packet and the second packet based on an optimization technology indicated by the optimization technology identifier. The optimization technology includes one or more of the following: load balancing, multi-fed and selective receiving, or multipath FEC.

FIG. 15 is a schematic diagram of a logical structure of a network device 1500 according to an embodiment of this application. The network device 1500 may be a second network device in a packet processing system, or a functional component of the second network device. The packet processing system further includes a first network device and a third network device. The first network device is located at a first site. The second network device and the third network device are located at a second site. The first site and the second site are connected through a wide area network. Refer to FIG. 15. The network device 1500 includes a receiving module 1510 and a sending module 1520. The receiving module 1510 is configured to implement the receiving sub-operation in operation 502 in the embodiment shown in FIG. 5. The sending module 1520 is configured to perform the sending sub-operation in operation 502 in the embodiment shown in FIG. 5. Details are as follows:

The receiving module 1510 is configured to receive a first packet sent by a first network device through a first tunnel.

The sending module 1520 is configured to forward the first packet to a third network device through a second tunnel.

In an embodiment, a tunnel packet that belongs to the first tunnel and carries the first packet includes a sequence number. The sending module is further configured to add, based on the sequence number, the sequence number to a tunnel packet that belongs to the second tunnel and carries the first packet.

In an embodiment, the tunnel packet that belongs to the first tunnel and carries the first packet includes a flow identifier. The sending module is further configured to add, based on the flow identifier, the flow identifier to the tunnel packet that belongs to the second tunnel and carries the first packet.

In an embodiment, the tunnel packet that belongs to the first tunnel and carries the first packet includes a forwarding identifier. The sending module is configured to forward the first packet based on the forwarding identifier.

In an embodiment, the second network device further includes a processing module 1530. The receiving module 1510 is further configured to receive a second packet sent by the first network device through the first tunnel. The processing module 1530 is configured to process the second packet.

In an embodiment, the tunnel packet that belongs to the first tunnel and carries the second packet includes a primary identifier. The processing module 1530 is further configured to process the second message based on the primary identifier.

In an embodiment, the tunnel packet that belongs to the first tunnel and carries the second packet includes an optimization technology identifier. The processing module 1530 is configured to process the second packet based on an optimization technology indicated by the optimization technology identifier. The optimization technology includes one or more of the following: load balancing, multi-fed and selective receiving, or multipath FEC.

In an embodiment, the receiving module 1510 is further configured to receive a third packet sent by the third network device via a third tunnel. The sending module 1520 is further configured to forward the third packet to the first network device through a fourth tunnel.

It should be noted that when the network device provided in the foregoing embodiment performs a packet processing task, division into the foregoing functional modules is used as an example for illustration. In actual application, the foregoing functions may be allocated to different functional modules and implemented based on a requirement. In other words, an inner structure of a device is divided into different functional modules to implement all or some of the functions described above. Furthermore, the network device provided in the foregoing embodiment belongs to a same idea as the packet processing method embodiment. As for a specific implementation process, refer to the method embodiment. Details are not described herein again.

FIG. 16 is a schematic diagram of a hardware structure of a network device 1600 according to an embodiment of this application. The network device 1600 may be the first network device or the second network device. Refer to FIG. 16. The network device 1600 includes a processor 1620, a memory 1640, a communication interface 1660, and a bus 1680. The processor 1620, the memory 1640, and the communication interface 1660 are connected to each other by using the bus 1680. The processor 1620, the memory 1640, and the communication interface 1660 may alternatively be connected in a connection manner other than the bus 1680.

The memory 1640 may be various types of storage media, for example, a random access memory (RAM), a read-only memory (ROM), a non-volatile RAM (NVRAM), a programmable ROM (PROM), an erasable PROM (EPROM), an electrically erasable PROM (EEPROM), a flash memory, an optical memory, and a hard disk.

The processor 1620 may be a general-purpose processor, and the general-purpose processor may be a processor that performs a specific operation and/or operation by reading and executing content stored in a memory (for example, the memory 1640). For example, the general-purpose processor may be a central processing unit (CPU). The processor 1620 may include at least one circuit, to perform all or some of the operations of the packet processing method provided in the embodiment shown in FIG. 5.

The communication interface 1660 includes an interface that is used to implement component interconnection inside the network device 1600, for example, an input/output (I/O) interface, a physical interface, or a logical interface, and an interface that is used to implement interconnection between the network device 1600 and another device (for example, another network device or user equipment). The physical interface may be an Ethernet interface, an optical fiber interface, an ATM interface, or the like.

The bus 1680 may be any type of communication bus, for example, a system bus, used to implement interconnection between the processor 1620, the memory 1640, and the communication interface 1660.

The foregoing components may be separately disposed on chips that are independent of each other, or at least some or all of the components may be disposed on a same chip. Whether the components are separately disposed on different chips or integrated and disposed on one or more chips usually depends on a requirement of a product design. Embodiments of this application impose no limitation on specific implementations of the foregoing components.

The network device 1600 shown in FIG. 16 is only an example. In an implementation process, the network device 1600 may further include another component, which is not illustrated one by one in this specification.

An embodiment of this application provides a packet processing system. The packet processing system includes a first network device, a second network device, and a third network device. The first network device is located at a first site. The second network device and the third network device are located at a second site. The first site and the second site are connected through a wide area network. FIG. 17 is a schematic diagram of a packet processing system 1700 according to an embodiment of this application. Refer to FIG. 17. The packet processing system 1700 includes a first network device 1710, a second network device 1720, and a third network device 1730. The first network device 1710 is located at a first site 1740. The second network device 1720 and the third network device 1730 are located at a second site 1750. The first site 1740 and the second site 1750 are connected through a wide area network 1760.

The first network device 1710 is configured to: send a first packet to the second network device 1720 through a first tunnel, and send a second packet to the third network device

1730 through a second tunnel. The first tunnel and the second tunnel traverse the wide area network 1760.

The second network device 1720 is configured to forward the first packet to the third network device 1730 through a third tunnel.

The third network device 1730 is configured to process the first packet and the second packet.

In an embodiment, the first network device 1710 is configured to: add a first sequence number to a tunnel packet that belongs to the first tunnel and carries the first packet, and add a second sequence number to a tunnel packet that belongs to the second tunnel and carries the second packet. The second network device 1720 is configured to add, based on the first sequence number, the first sequence number to a tunnel packet that belongs to the third tunnel and carries the first packet. The third network device 1730 is configured to process the first packet and the second packet based on the first sequence number and the second sequence number.

In an embodiment, the tunnel packet that belongs to the first tunnel and carries the first packet includes a flow identifier, and the tunnel packet that belongs to the second tunnel and carries the second packet includes a flow identifier. The flow identifier is used to identify a data flow to which each of the first packet and the second packet belongs. The second network device 1720 is configured to add, based on the flow identifier, the flow identifier to the tunnel packet that belongs to the third tunnel and carries the first packet.

In an embodiment, the tunnel packet that belongs to the second tunnel and carries the second packet includes a primary identifier. The primary identifier indicates the third network device 1730 to process the second packet.

In an embodiment, the tunnel packet that belongs to the first tunnel and carries the first packet includes a forwarding identifier. The forwarding identifier indicates the second network device 1720 to forward the first packet.

In an embodiment, the tunnel packet that belongs to the second tunnel and carries the second packet includes an optimization technology identifier. The third network device 1730 processes the first packet and the second packet based on an optimization technology indicated by the optimization technology identifier. The optimization technology includes one or more of the following: load balancing, multi-fed and selective receiving, or multipath FEC.

In an embodiment, the third network device 1730 is configured to: send a third packet to the second network device 1720 through a fourth tunnel, and send a fourth packet to the first network device 1710 through a fifth tunnel. The second network device 1720 is configured to forward the third packet to the first network device 1710 through a sixth tunnel. The first network device 1710 is configured to process the third packet and the fourth packet.

An embodiment of this application provides a computer-readable storage medium. The computer-readable storage medium stores a computer program. When the computer program is executed by a processor, all or some of the operations of the packet transmission method provided in the embodiment in FIG. 5 are implemented.

It should be understood that sequence numbers of the foregoing processes do not mean execution orders in embodiments of this application. The execution orders of the processes should be determined based on functions and internal logic of the processes, and should not constitute any limitation on the implementation processes of embodiments of this application.

In the foregoing specific implementations, the objectives, technical solutions, and beneficial effects of the present invention are further described in detail. It should be understood that the foregoing descriptions are only specific implementations of the present invention, but are not intended to limit the protection scope of the present invention. Any modification, equivalent replacement, improvement, or the like made based on the technical solutions of the present invention shall fall within the protection scope of the present invention.

What is claimed is:

1. A packet processing system implemented in a multi-gateway scenario, comprising:

a first network device, a second network device, and a third network device, the first network device is located at a first site, the second network device and the third network device are located at a second site to implement the multi-gateway scenario, and the first site and the second site are connected through a wide area network;

the first network device is configured by a processor of the first network device to: send a first packet to the second network device through a first tunnel, and send a second packet to the third network device through a second tunnel;

the second network device is configured by a processor of the second network device to forward the first packet to the third network device through a third tunnel; and the third network device is configured by a processor of the third network device to process the first packet and the second packet.

2. The system according to claim 1, wherein the first network device is configured by the processor of the first network device to: add a first sequence number to a tunnel packet that belongs to the first tunnel and carries the first packet, and add a second sequence number to a tunnel packet that belongs to the second tunnel and carries the second packet;

the second network device is configured by the processor of the second network device to add, based on the first sequence number, the first sequence number to a tunnel packet that belongs to the third tunnel and carries the first packet; and the third network device is configured by the processor of the third network device to process the first packet and the second packet based on the first sequence number and the second sequence number.

3. The system according to claim 1, wherein a tunnel packet that belongs to the first tunnel and carries the first packet comprises a flow identifier, wherein the flow identifier is used to identify a data flow to which the first packet belongs;

a tunnel packet that belongs to the second tunnel and carries the second packet comprises the flow identifier, wherein the flow identifier is used to identify the data flow to which the second packet belongs; and the second network device is configured by the processor of the second network device to add, based on the flow identifier, the flow identifier to the tunnel packet that belongs to the third tunnel and carries the first packet.

4. The system according to claim 1, wherein a tunnel packet that belongs to the second tunnel and carries the second packet comprises a primary identifier, wherein the primary identifier indicates the third network device to process the second packet.

5. The system according to claim 1, wherein a tunnel packet that belongs to the first tunnel and carries the first packet comprises a forwarding identifier, wherein the forwarding identifier indicates the second network device to forward the first packet.

6. The system according to claim 1, wherein
a tunnel packet that belongs to the second tunnel and carries the second packet comprises an optimization technology identifier, and the third network device is configured by the processor of the third network device to process the first packet and the second packet based on an optimization technology indicated by the optimization technology identifier, wherein the optimization technology comprises one or more of the following: load balancing, multi-fed and selective receiving, or multipath forward error correction (FEC).

7. The system according to claim 1, wherein
the third network device is further configured by the processor of the third network device to: send a third packet to the second network device through a fourth tunnel, and send a fourth packet to the first network device through a fifth tunnel;
the second network device is further configured by the processor of the second network device to forward the third packet to the first network device through a sixth tunnel; and
the first network device is further configured by the processor of the first network device to process the third packet and the fourth packet.

8. A first network device, comprising:
a memory, wherein the memory stores a program, and
a processor, when the program executed by the processor, cause the first network device to:
obtain a plurality of packets, wherein the plurality of packets comprise a first packet and a second packet; and
send the first packet to a second network device through a first tunnel, and send the second packet to a third network device through a second tunnel, wherein
the first network device is located at a first site, the second network device and the third network device are located at a second site to implement a multi-gateway scenario, and the first site and the second site are connected through a wide area network.

9. The first network device according to claim 8, wherein
the program executed by the processor further cause the first network device to: add a first sequence number to a tunnel packet that belongs to the first tunnel and carries the first packet, and add a second sequence number to a tunnel packet that belongs to the second tunnel and carries the second packet.

10. The first network device according to claim 8, wherein
a tunnel packet that belongs to the first tunnel and carries the first packet comprises a flow identifier, wherein the flow identifier identifies a data flow to which the first packet belongs; and
a tunnel packet that belongs to the second tunnel and carries the second packet comprises the flow identifier, wherein the flow identifier identifies the data flow to which the second packet belongs.

11. The first network device according to claim 8, wherein
a tunnel packet that belongs to the second tunnel and carries the second packet comprises a primary identifier, wherein the primary identifier indicates the third network device to process the second packet.

12. The first network device according to claim 8, wherein
a tunnel packet that belongs to the first tunnel and carries the first packet comprises a forwarding identifier, wherein the forwarding identifier indicates the second network device to forward the first packet.

13. The first network device according to claim 8, wherein
a tunnel packet that belongs to the second tunnel and carries the second packet comprises an optimization technology identifier, wherein the optimization technology identifier indicates the third network device to process the first packet and the second packet based on an optimization technology indicated by the optimization technology identifier, and the optimization technology comprises one or more of the following: load balancing, multi-fed and selective receiving, or multipath forward error correction FEC.

14. A second network device, comprising:
a memory, wherein the memory stores a program, and
a processor, when the program executed by the processor, cause the second network device to:
receive a first packet sent by a first network device through a first tunnel; and
forward the first packet to a third network device through a second tunnel, wherein
the first network device is located at a first site, the second network device and the third network device are located at a second site to implement a multi-gateway scenario, and the first site and the second site are connected through a wide area network.

15. The second network device according to claim 14, wherein
a tunnel packet that belongs to the first tunnel and carries the first packet comprises a sequence number; and
the program executed by the processor further cause the second network device to: add, based on the sequence number, the sequence number to a tunnel packet that belongs to the second tunnel and carries the first packet.

16. The second network device according to claim 14, wherein
a tunnel packet that belongs to the first tunnel and carries the first packet comprises a flow identifier; and
the program executed by the processor further cause the second network device to: add, based on the flow identifier, the flow identifier to a tunnel packet that belongs to the second tunnel and carries the first packet.

17. The second network device according to claim 14, wherein
a tunnel packet that belongs to the first tunnel and carries the first packet comprises a forwarding identifier; and
the program executed by the processor further cause the second network device to forward the first packet based on the forwarding identifier.

18. The second network device according to claim 14, wherein the program executed by the processor further cause the second network device to:
receive a second packet sent by the first network device through the first tunnel; and
process the second packet.

19. The second network device according to claim 18, wherein
a tunnel packet that belongs to the first tunnel and carries the second packet comprises a primary identifier; and
the program executed by the processor further cause the second network device to process a second message based on the primary identifier.

20. The second network device according to claim 18, wherein
a tunnel packet that belongs to the first tunnel and carries the second packet comprises an optimization technology identifier; and
the program executed by the processor further cause the second network device to: process the second packet based on an optimization technology indicated by the optimization technology identifier, wherein the optimization technology comprises one or more of the following: load balancing, multi-fed and selective receiving, or multipath forward error correction (FEC).

* * * * *